US010963603B2

(12) United States Patent
Catthoor et al.

(10) Patent No.: US 10,963,603 B2
(45) Date of Patent: Mar. 30, 2021

(54) SIMULATION OF PHOTOVOLTAIC SYSTEMS

(71) Applicants: IMEC VZW, Leuven (BE); Katholieke Universiteit Leuven, KU LEUVEN R&D, Leuven (BE)

(72) Inventors: Francky Catthoor, Temse (BE); Maria-Iro Baka, Heverlee (BE); Patrizio Manganiello, Hasselt (BE)

(73) Assignees: Imec vzw, Leuven (BE); Katholieke Universiteit Leuven, KU Leuven R&D, Leuven (BE)

( * ) Notice: Subject to any disclaimer, the term of this patent is extended or adjusted under 35 U.S.C. 154(b) by 338 days.

(21) Appl. No.: 16/215,216

(22) Filed: Dec. 10, 2018

(65) Prior Publication Data
US 2019/0197203 A1 Jun. 27, 2019

(30) Foreign Application Priority Data
Dec. 27, 2017 (EP) ..................................... 17210740

(51) Int. Cl.
*G06F 17/50* (2006.01)
*G06F 30/20* (2020.01)
(Continued)

(52) U.S. Cl.
CPC ............... *G06F 30/20* (2020.01); *G01W 1/12* (2013.01); *G05F 1/67* (2013.01); *H02J 3/385* (2013.01);
(Continued)

(58) Field of Classification Search
None
See application file for complete search history.

(56) References Cited

U.S. PATENT DOCUMENTS

2009/0234601 A1* 9/2009 Wu ........................ H02S 50/10
702/64

FOREIGN PATENT DOCUMENTS

| CN | 105375878 A | 3/2016 |
|---|---|---|
| EP | 3007234 A1 | 4/2016 |
| EP | 2998756 B1 | 5/2017 |

OTHER PUBLICATIONS

Sri Rama, Efficiency of Photovoltaic Systems in Mountainous Areas, Sep. 19, 2018, 6 pages (Year: 2018).*
(Continued)

*Primary Examiner* — Tung S Lau
(74) *Attorney, Agent, or Firm* — McDonnell Boehnen Hulbert & Berghoff LLP

(57) ABSTRACT

A method for generating/updating a database of current-voltage characteristic curves is disclosed. This method includes simulating for at least one combination of a topology of a photovoltaic cell group, an internal cell temperature(s) and a cell irradiation(s), a model of the photovoltaic cell group to provide a representative current-voltage characteristic curve, and clustering the current-voltage characteristic curves to identify at least one plurality of similar current-voltage characteristic curves. The method also includes generating a many-to-one mapping in the database to map query requests corresponding to each of the at least one plurality of similar current-voltage characteristic curves onto a single representative current-voltage characteristic curve for that plurality, each query request identifying a topology of a photovoltaic cell group, at least one internal temperature for the photovoltaic cells in the photovoltaic cell group and at least one cell irradiation for the photovoltaic cells in the photovoltaic cell group.

18 Claims, 14 Drawing Sheets
(4 of 14 Drawing Sheet(s) Filed in Color)

(51) Int. Cl.
*H02S 50/10* (2014.01)
*G01W 1/12* (2006.01)
*G05F 1/67* (2006.01)
*H02J 3/38* (2006.01)
*H02J 3/00* (2006.01)
*G06F 111/10* (2020.01)
*G06F 119/08* (2020.01)

(52) U.S. Cl.
CPC .......... *H02S 50/10* (2014.12); *G06F 2111/10* (2020.01); *G06F 2119/08* (2020.01); *H02J 3/003* (2020.01); *H02J 2203/20* (2020.01)

(56) References Cited

OTHER PUBLICATIONS

Open-Circuit Voltage, Jan. 26, 2021, 9 pages (Year: 2021).*
Daniel F. Butay, Maximum Peak Power Tracker: A Solar Application, 127 pages, Apr. 24, 2008 (Year: 2008).*
Solar Cells: A Guide to Theory and Measurement, 22 pages, Jan. 26, 2021 (Year: 2021).*
TI Designs Voltage, Current, and Temperature Monitoring for Solar Module Level Power Electronics (22 pages, Dec. 2016) (Year: 2016).*
Kurt Wade Woods, Solar Energy Conversion and Control Using Organic Photovoltaic Cells, Dec. 2013, 117 pages (Year: 2013).*
European Search Report, European Patent Application No. 17210740.1, dated Jun. 20, 2018, 14 pages.
Chroma ATE: Home/Products/Power Electronics Test Solution/DC Power Supply, "Solar Array Simulator Model 62000H-S Series, Key Features", Oct. 25, 2017, Retrieved from the Internet: URL:https//web.archive.org/web/20171026181343/http://www.chromaate.com/product/62150H-600S_1000S_Solar_Array_Simulator.htm, retrieved May 15, 2018, 11 pages.
Chroma ATE: "Chroma's 6000H-S Series Solar Array Simulator Data Sheet", Oct. 26, 2017, Retrieved from the Internet: URL:https://web.archive.org/web/20171026181343/http://www.chromaate.com/File/Download/42169, retrieved from the internet on May 15, 2018, pp. 1-8.
Chroma ATE: "Dynamic Shadow I-V Curve Simulation for PV Inverter MPPT Testing", Youtube, Nov. 11, 2014, retrieved from the Internet: URL:https://www.youtube.com/watch?v=WFIDn5icuGc, retrieved on Dec. 10, 2018, 2 pages.
Chroma ATE: "Solar Array Simulator (English Version)", Youtube, Jul. 6, 2012, retrieved from the Internet: URL:https://www.youtube.com/watch?v=azU9HYX52zl, retrieved on Dec. 10, 2018, 2 pages.

* cited by examiner

FIG 1 – PRIOR ART

SIMULATION OF PHOTOVOLTAIC SYSTEMS

CROSS-REFERENCE TO RELATED APPLICATIONS

The present application is a non-provisional patent application claiming priority to European Patent Application No. EP 17210740.1, filed Dec. 27, 2017, the contents of which are hereby incorporated by reference.

FIELD OF THE DISCLOSURE

The disclosure relates to the field of simulation and modeling of photovoltaic systems. More specifically it relates to a method for estimating a performance measure and/or operating parameter of a photovoltaic system configuration under a sequence of temporally evolving operating conditions, a method for generating a database for use in combination with the aforementioned method, and computer program products and devices for implementing such methods.

BACKGROUND

Solar energy may be a source of clean energy production on-site. For example, photovoltaic installations may provide energy in urban areas, where the operating conditions of the photovoltaic arrays are not always optimal. Under partial shading conditions, which can occur frequently in rooftop installations, building integrated photovoltaics and solar-powered vehicles, the conventional design of a photovoltaic module or system may not reach the demand for an increased energy yield. Dynamic configurations may have an improved performance under non-uniform dynamic conditions, but may be difficult to optimize, in design and control, for the specific on-site conditions. For example, multiple options may exist for the design of a reconfigurable module, which can lead to a large number of potential topologies.

The integration of photovoltaic energy sources, e.g. in a distributed photovoltaic (or a hybrid photovoltaic) plant or system, in a configuration and/or at a location characterized by non-ideal irradiation circumstances implies various complications. It may be particularly difficult to predict the net energy production, since this may strongly depend on local circumstances and weather conditions, e.g. such as temperature, clouding and wind conditions.

For example, static objects in the vicinity, e.g. trees, may cast shadows on the photovoltaic elements that typically move slowly and smoothly. Other changes over a relatively large time scale may occur, such as a slow accumulation of soiling. Furthermore, passing objects may cast shadows that move over the elements at various speeds, e.g. medium-speed objects such as birds, large insects and leaves and fast objects such as clouds. Therefore, a detailed simulation and modelling of a plant may be used explore different configurations of the plant before it goes into production. For example, such configurations may take many controllable parameters and variations into account, such as configurations of bypasses, switches and DC-DC converters at different granularity levels, e.g. at the module, string and plant level.

A need exists in the art for modeling and simulation approaches that can accurately take dynamic effects, such as described hereinabove, into account and also allow an exploration of a vast space of controllable parameters and variations in configuration of the plant for different shading scenarios, which can be executed in a computationally efficient manner. Furthermore, a modeling and simulation approach should allow for a flexible configuration of the simulated module such that not only conventional modules with static series-connected cell strings can be simulated, but also, for example, reconfigurable modules.

Black-box models are known in the art for simulating photovoltaic systems. While such models may be computationally efficient, these may have a less than desirable accuracy, particularly in modeling non-ideal circumstances. For example, simplified engineering models for photovoltaic arrays and systems are known in the art. However, determining the module parameters may require, in such approaches, module-specific flash tests for different temperatures and irradiance levels and/or field measurements. Such models may have a limited inaccuracy when applied to a measured hourly irradiance value. At the photovoltaic system level, such models may allow the modelling of the inverter efficiency as a function of DC power and voltage. However, alternative models art may be difficult to extend or extrapolate to distributed topologies, such as module-integrated DC-DC converters with a central DC-AC conversion step or topologies with configurable switches.

On the other hand, detailed white-box models are known in the art, which may have adequate accuracy, but may be too slow to use in practice, particularly for evaluating a large configuration space under different shading and environmental scenarios. For example, state-of-the-art photovoltaic cell, module and array modelling may be based on the conventional equivalent circuit models. Parameters for such models may be determined from data sheets for standard test conditions, and specific deviations from the standard test conditions, such as the solar spectrum, reflection losses or the temperature distribution over the module may be typically neglected. These white-box models as known in the art may also lack the flexibility to extend for configurable hardware components like local DC-DC convertors and switches.

The performance of photovoltaic modules in the field may be significantly affected by the ambient conditions they are subjected to during operational life. This applies in absolute terms, but variations thereof, such as year-by-year, daily, hourly and even in the second range, may have a non-negligible impact. The ambient conditions that may be considered as important in this respect are moisture, temperature and insolation. In terms of temperature, which is also significantly dependent on insolation levels, the impact can be manifold. Thermal cycling may mechanically stress the module and may cause cracking and delamination of the different layers in the module over time. The overall module temperature may directly impact the module performance, since increased temperatures at the cell level may negatively impact the overall performance. Local variations in illumination and/or temperature, over time as well as spatially, may cause mismatch between the cells connected in series. Therefore, the operational temperature may have a strong impact on the potential energy yield of such modules, either through a reduction of the operational lifetime, e.g. reliability issues related to thermal cycling, or through suboptimal performance of the different cells in the module.

Module temperature may be determined by environmental factors. Its influence on the energy yield may depend on the solar cell technology. Thermo-electric and multi-dimensional simulation models for photovoltaic devices are known in the art. For example, a thermal model of a photovoltaic module may be used to predict the performance and efficiency of the cell. However, some assumptions, such as uniform temperature of each layer with negligible thermal capacitance and similar simplifications, may typically be used for transient simulations using such models. In addition, wind and air flow effects, in general, may be incorporated in the model to obtain sufficiently accurate thermal modeling of realistic non-uniform conditions.

In conclusion, a need exists in the art for a combined validated model that accounts for the fine-grain spatial and temporal optical, thermal and electrical phenomena on the photovoltaic module level. For yield calculations, DC/DC converters and inverters may be modelled by their efficiency as a function of DC power and voltage. For configurable modules, switches maybe incorporated. The interaction with the PV array may be described by the maximum power point tracking efficiency, e.g. assessed in accordance with EN 5053031.

Uncertainty information for the modelling chain from irradiance data to power may be particularly important for photovoltaic project budgeting. The standard deviation of photovoltaic yield calculations can be estimated to be around 4.5% with estimated standard deviations between 0.5% and 3% in the different modelling steps.

EP 2 998 756 discloses an example bottom-up photovoltaic energy yield model. Particularly, a method for calculating a performance of a photovoltaic module comprising at least two photovoltaic cells is disclosed. A heat flow between the photovoltaic cells is calculated using thermal equivalent circuits of the respective photovoltaic cells, interconnected by a thermal coupling resistance. This approach enables the evaluation of an influence of spatial and temporal variations in the operation conditions on the performance, such as the energy yield, of the module or a larger photovoltaic system. For example, technical data of a photovoltaic module and information on weather conditions, e.g. locally gathered or inferred from weather models, may be taken into account.

FIG. 1 illustrates such a prior-art integrated bottom-up energy yield prediction and evaluation model, which can be evaluated based on physical properties and outdoor measurements, e.g. historical data, or predicted data relating to the weather, e.g. irradiance, ambient temperature, equivalent-uniform global wind speed and wind direction. Furthermore, solar spectral information and sky temperature may also be used for higher accuracy. Such an optical-electrical-thermal model can, for example, be used to evaluate energy yield of novel module concepts.

For example, a layer-by-layer optical absorption model may be used to calculate the generated heat and potential electrical energy in each layer of the photovoltaic module. Such models may also efficiently combine angular and spectral information of the incident irradiation.

The temperature of each solar cell within a module may be calculated by a thermal circuit. This thermal circuit contains all the physical properties, e.g. dimensions and quantities such as thermal capacity and resistance of the materials used, of the photovoltaic module. The values of the circuit can be taken from either purely physical values or can be extracted from measurements. Such circuit model may take conduction, convection and radiation of heat into account. Each thermal circuit may be coupled to the thermal circuit of its neighboring solar cells, e.g. to allow conduction of heat in lateral and longitudinal directions. The circuit model may use the generated heat in each layer, calculated by the optical absorption model, as input. Wind tunnel tests and finite element modeling simulations may be used to gain insight into the relation between the global uniform wind speed and the spatially resolved heat transfer coefficient at the surface of the module. Thus, in such approach, the temperature of each solar cell within the module may be modelled accurately during highly varying, non-uniform conditions and this with high spatial (e.g. per cell) and temporal (e.g. up to 1 sec) resolution.

The electrical characteristics of each solar cell may be modelled by the 1- or 2-diode models known in the art. The parameters of such models may be extracted from flash or steady-state current and voltage measurements, or from device simulations. The thermal circuit, as described above, may be used to calculate the temperature of each solar cell in a photovoltaic module, and this temperature may be used as input parameter of the electrical circuit. A full electrical-thermal model of a photovoltaic module is formed by coupling the individual electrical circuits.

However, in order to take different shading conditions into account, a high computational burden could be implied. For example, the number of possible shading patterns for a module, e.g. comprising 60 cells, can be high. Even, if for a given irradiation level, shading of a single cell is considered as a binary attribute, $2^{60}$ possible shading patterns could arise. If unrealistic or irrelevant shading patterns are excluded, thousands or even millions of separate simulation runs could be required to cover all possible operating conditions.

Furthermore, if parameters and design choices of a reconfigurable module are to be taken into account, e.g. the size and shape of cell strings, the number of local converters, the number of configurable series and parallel connections supported by switches, the connection configuration of the local converters and the connection configuration to the module converter, in which, in simulation, each of these may need to be iterated over different run-time configurations of the reconfigurable module (e.g. active current paths) and over the different operating conditions to be taken into account, the number of required simulations would therefore rapidly exceed a computationally feasible number of evaluations of the model.

SUMMARY

Various embodiments may provide efficient methods for simulating a photovoltaic system, e.g. a photovoltaic plant. For example, an efficient simulation of a photovoltaic plant can be provided, which can, for example, efficiently take location-specific information of the plant into account.

In some embodiments, an accurate modeling and simulation of a photovoltaic plant can be achieved.

In some embodiments, a flexible and/or extensible modeling and simulation of a photovoltaic plant is provided.

In some embodiments, a large parameter and configuration space of a photovoltaic plant can be efficiently explored under different shading and environmental conditions.

In some embodiments, accuracy and speed can be simultaneously achieved in modeling and simulating a photovoltaic plant.

In some embodiments, a photovoltaic plant can be simulated and/or modelled under a plurality of strongly varying conditions and for a plurality of different configurations of the plant, e.g. over a large parameter space defining a large plurality of different configurations.

In some embodiments, correlations, probabilistic dependencies or deterministic dependencies can be exploited to achieve an error reduction, e.g. correlations and/or dependencies between strongly varying conditions and/or configurations, e.g. configuration and/or shading parameter interactions influenced in a location-specific manner.

In some embodiments, a clustering approach is provided to reduce computational complexity and to exploit intricate correlations, probabilistic dependencies and/or deterministic dependencies in the explored environmental and/or local shading conditions and/or the explored configuration space.

In some embodiments, local shading conditions, e.g. a large space comprising a plurality of such dynamic shading conditions, e.g. in addition to other local conditions, such as various weather conditions, can be efficiently taken into account in simulation and/or modelling of a photovoltaic plant.

In some embodiments, accurate forecasts can be obtained for an energy yield of a photovoltaic installation under a plurality of representative dynamic shading conditions, e.g. when the external irradiation conditions are used as input.

Some embodiments may provide a computer-implemented method for generating and/or updating a database comprising a plurality of current-voltage characteristic curves. The database may be a database suitable for being used in estimating at least one performance measure and/or operating parameter of a photovoltaic system configuration under a sequence of temporally evolving operating conditions, for example, for being used in estimating an energy yield of the photovoltaic system. The method comprises simulating, for at least one combination of a topology of a photovoltaic cell group, at least one internal temperature for the photovoltaic cells in the photovoltaic cell group and at least one cell irradiation for the photovoltaic cells in the photovoltaic cell group, a model of the photovoltaic cell group to provide a current-voltage characteristic curve representative of that combination.

The at least one internal temperature for each photovoltaic cell in the photovoltaic cell group may consist of a plurality of internal temperature values corresponding to the plurality of photovoltaic cells in the photovoltaic cell group.

The internal temperature for each photovoltaic cell in the photovoltaic cell group may also be calculated from a set of temperatures that does not directly correspond to a plurality of internal temperature values, e.g. but that can be derived therefrom.

The at least one internal temperature for each photovoltaic cell in the photovoltaic cell group may also consist of a single internal temperature value that is representative of the internal temperatures for the plurality of photovoltaic cells in the photovoltaic cell group.

The at least one internal temperature for each photovoltaic cell in the photovoltaic cell group may consist of a plurality of representative internal temperature values, in which each of these representative internal temperature values is assigned to one or more cells of the photovoltaic cell group, e.g. where the temperature may be assumed to be uniform over these one or more cells, but not necessarily uniform over all cells of the cell group.

Likewise, the at least one cell irradiation for each photovoltaic cell in the photovoltaic cell group may consist of a plurality of cell irradiation values corresponding to the plurality of photovoltaic cells in the photovoltaic cell group, may consist of a single cell irradiation value that is representative of the cell irradiation of the plurality of photovoltaic cells in the photovoltaic cell group, or may consist of a plurality of representative cell irradiation values, in which each of these representative cell irradiation values is assigned to one or more cells of the photovoltaic cell group, e.g. where the irradiation may be assumed to be uniform over these one or more cells, but not necessarily uniform over all cells of the cell group. The at least one cell irradiation for each photovoltaic cell in the photovoltaic cell group may also be calculated from a set of irradiation values that does not directly correspond to a plurality of cell irradiations, e.g. but that can be derived therefrom.

The method also comprises clustering the current-voltage characteristic curves to identify at least one plurality of similar current-voltage characteristic curves and generating a many-to-one mapping in the database to map query requests that correspond to each of the at least one plurality of similar current-voltage characteristic curves onto a single representative current-voltage characteristic curve for that plurality of similar current-voltage characteristic curves. Each query request identifies a topology of a photovoltaic cell group, at least one internal temperature for the photovoltaic cells in the photovoltaic cell group and at least one cell irradiation for the photovoltaic cells in the photovoltaic cell group. Similarly to what was described hereinabove, the at least one internal temperature and/or the at least one cell irradiation may consist, each, of one or more than one value, e.g. k values, where $1 \leq k \leq M$, and where M refers to the number of photovoltaic cells in the photovoltaic cell group identified by its topology, e.g. by a topology identifier. Furthermore, such query requests may not necessarily correspond directly to, e.g. consist of, the parameters referred to hereinabove, but may also be defined in a parameter space that is directly and unambiguously translatable to such parameters, e.g. by a clearly defined bijective relation between the query parameters and the parameters referred to hereinabove.

In some embodiments, the step of simulating may comprise simulating an electrical-optical model or an electrical-thermo-optical model of the photovoltaic cell group configured in accordance with the topology and taking the at least one cell internal temperature and the at least one cell irradiation into account.

Some embodiments may comprise identifying the similar current-voltage characteristic curves by calculating a similarity and/or distance measure between each pair of current-voltage characteristic curves, e.g. each pair of the curves being considered in the step of clustering.

In some embodiments, the similarity and/or distance measure may comprise a distance metric, for example an aggregate distance over corresponding points between a pair of curves. In some embodiments, the distance metric may comprise a maximum distance, a median distance and/or an average distance or another statistical summary) over distance evaluations of corresponding points in the pair of curves, or may be another summary measure, such as a median or average. The distance metric may be a maximum difference in current or voltage, e.g. operating in one dimension, or it may be a two-dimensional distance metric based on, for example, an area between the pair of curves, e.g. a difference of the area under the curve for the pair of curves respectively. The distance metric may be based on a comparison, e.g. a difference, of a quantity determined by a functional relationship from the voltage and current defined by the pair of curves, such as a maximum difference in power.

In some embodiments, the clustering may comprise determining the similar current-voltage characteristic curves as a plurality of curves for which the distance metric between any pair of the plurality of curves is less than a predetermined threshold. For example, a set of current-voltage characteristic curves may be determined to be similar if the distance metric between any pair of the curves in the set is less than a predetermined distance.

In some embodiments, the clustering may comprise applying a clustering algorithm, e.g. a k-means clustering algorithm.

In some embodiments, the clustering of the current-voltage characteristic curves to identify at least one plurality of similar current-voltage characteristic curves may also comprise identifying a plurality of current-voltage characteristic curves that are dissimilar with respect to any of the curves of the at least one plurality of similar current-voltage characteristic curves, e.g. a plurality of outlier current-voltage characteristic curves. The method may comprise generating a many-to-one mapping in the database to map query requests that correspond to each of the plurality of dissimilar current-voltage characteristic curves onto one or more backup scenarios, e.g. one or more representative current-voltage characteristic curves.

For example, a first set of query requests corresponding to a plurality of dissimilar current-voltage characteristic curves may be mapping onto a first backup scenario, a second set of query requests corresponding to another plurality of dissimilar current-voltage characteristic curves may be mapped onto a second backup scenario, etc. Additionally or alternatively, different backup scenarios may be provided for the same plurality of dissimilar current-voltage characteristic curves, e.g. such that, in use of the database, a backup scenario can be selected as a function of an objective.

For example, one or more of the backup scenarios may provide a rough under- or over-estimation of one or more quantities of interest, e.g. an under-estimation of the power produced by the photovoltaic cell group.

In an example embodiment, one or more backup scenarios may provide a sufficient accuracy when calculating an overall parameter and/or quality measure of interest, even though the accuracy of the backup scenario as such can be low. For example, even though a backup scenario may relate to a strong underestimation, the backup scenario may correspond to an operating condition or operating conditions that are rare, such that an impact on an objective function, e.g. an energy-yield, when considered over a sequence of time steps, e.g. over a prolonged time frame, could remain low.

Some embodiments may comprise determining a compact representation of a current-voltage characteristic curve. This determining of the compact representation may comprise determining at least one curve segment of the current-voltage characteristic curve that is substantially linear and representing the curve segment in the compact representation by a current value and a voltage value for each of both endpoints of the curve segment. The determining of the compact representation may comprise adding (e.g. including in the compact representation) current values and voltage values corresponding to a frequent operating point, an open circuit voltage and/or a short-circuit current to the compact representation.

Some embodiments may comprise generating a plurality of combinations by an exhaustive enumeration of, or sampling from, a parameter space defined by at least the at least one internal temperature of each photovoltaic cell in the photovoltaic cell group and the at least one cell irradiation of each photovoltaic cell in the photovoltaic cell group. The method may comprise selecting the at least one combination for the step of simulating from the generated plurality of combinations by eliminating improbable and/or infeasible and/or redundant combinations from the plurality of combinations.

Some embodiments may include, for combinations of the generated plurality of combinations that were eliminated for being improbable, providing a rough estimate of the current-voltage characteristic curve instead of simulating the current-voltage characteristic curve using the model.

In some embodiments, the step of selecting the at least one combination from the plurality of generated combinations may comprise eliminating combinations, from the plurality of generated combinations, for which the current-voltage characteristic curve can be represented by a parameterized transformation of another current-voltage characteristic curve corresponding to another of the plurality generated combinations. The method may also comprise determining the current-voltage characteristic curve for the eliminated combinations by the parameterized transformation.

Example embodiments may provide a computer-implemented method for estimating at least one performance measure and/or operating parameter of a photovoltaic system configuration under a sequence of temporally evolving operating conditions. The photovoltaic system configuration comprises a configuration of a plurality of static and/or dynamically switchable parallel and/or serial interconnections between photovoltaic cell groups. The method may also comprise one or many electrical converters. The method comprises obtaining a database comprising a plurality of current-voltage characteristic curves. Each current-voltage characteristic curve is accessible by a query request identifying a topology of a photovoltaic cell group, at least one internal temperature for the photovoltaic cells in the photovoltaic cell group and at least one cell irradiation for the photovoltaic cells in the photovoltaic cell group. The database provides a mapping of the query request onto the plurality of current-voltage characteristic curves in the form of a many-to-one mapping such as to map a cluster of different topologies and/or different internal temperatures and/or different cell irradiations onto a single representative current-voltage characteristic curve.

The method comprises receiving data indicative of the sequence of operating conditions as input, in which the data comprises at least an irradiation, an ambient temperature and a wind velocity for each step of the sequence.

The method comprises determining, for at least one photovoltaic cell, e.g. for each photovoltaic cell, in each of the photovoltaic cell groups, a sequence of internal temperatures corresponding to the sequence of operating conditions, taking at least the irradiation, the ambient temperature and the wind velocity into account.

The method comprises selecting, for each of the photovoltaic cell groups, a representative current-voltage curve from the database by a query request based on a topology of the photovoltaic cell group, the irradiation map and the internal temperatures determined for at least one photovoltaic cell of the photovoltaic cell group.

The method comprises calculating at least one aggregate current-voltage characteristic curve for each step of the sequence of evolving operating conditions.

The method comprises outputting at least one performance and/or operating parameter for each step of the sequence of evolving operating conditions, e.g. based on the at least one aggregate current-voltage characteristic curve.

In some embodiments, the step of obtaining the database may comprise generating and/or updating the database in accordance with a method as described in the present disclosure.

In some embodiments, the step of selecting the representative current-voltage curve from the database may comprise updating the database by a method as described in the present disclosure, if the query request generated in the step of selecting does not retrieve a result.

In some embodiments, the step of determining of the sequence of internal temperatures may comprise calculating the internal temperature for at least one photovoltaic cell in each of the photovoltaic cell groups and for each time step of the sequence of operating conditions by evaluating a state equation of an $N^{th}$ order thermal model that takes into account the ambient temperature for that time step, the irradiation for that time step, the ambient temperatures corresponding to the N−1 preceding time steps, the irradiations corresponding to the N−1 preceding time steps and the internal temperatures that were determined for the cell for the N−1 preceding time steps.

In some embodiments, the time step increment between consecutive steps of the sequence may be non-uniform, e.g. different pairs of adjacent time steps in the sequence are not necessarily separated by a same unit of time.

Some embodiments may comprise selecting an operating point of the at least one aggregate current-voltage characteristic curve for each time step of the sequence of operating conditions, taking a predetermined objective into account.

In some embodiments, the operating point selected for a time step of the sequence of temporally evolving operating conditions may be taken into account in determining the internal temperatures for a next time step of the sequence of temporally evolving operating conditions.

In some embodiments, the state equation of the $N^{th}$ order thermal model may take the selected operating point for the current time step and/or the preceding time step and/or a plurality of preceding time steps into account.

In some embodiments, the step of calculating the at least one aggregate current-voltage characteristic curve may comprise transforming and combining at least one pair of the selected current-voltage characteristic curves by taking a parasitic electrical property into account, such as a parasitic resistance or impedance. For example, a parasitic electrical property of at least one interconnecting wire, e.g. of a series or parallel connection, of at least one switch and/or of at least one bypass element, e.g. a standard bypass diode or a smart bypass diode, may be taken into account. Where reference is made to a "smart" bypass diode, this may refer to an active bypass diode, e.g. in which a self-activation is provided based on a predetermined operating current and/or voltage level, or a controllable bypass diode.

In some embodiments, the step of calculating the at least one aggregate current-voltage characteristic curve may comprise transforming and combining at least one pair of the selected current-voltage characteristic curves by taking a serial interconnection resistance between the corresponding pair of cell groups or a parallel interconnection resistance between the corresponding pair of cell groups into account.

In some embodiments, the step of calculating the at least one aggregate current-voltage characteristic curve may comprise calculating an aggregate current-voltage characteristic curve, e.g. for applying as input to an objective function, such as an MPPT objective function and/or for at least one converter that is active in accordance with the photovoltaic system configuration.

In some embodiments, the step of calculating the at least one aggregate current-voltage characteristic curve for each converter may comprise:
  selecting a pair of cell groups connected to that converter in accordance with the photovoltaic system configuration,
  determining whether the pair of cell groups are connected in series or in parallel to each other in accordance with the photovoltaic system configuration,
  assigning a resistance to the serial or parallel connection between the pair of cell groups in accordance with the photovoltaic system configuration,
  subtracting a linear current-voltage curve from either or both of the current-voltage characteristic curves selected for that pair of cell groups, wherein a voltage over current ratio of the linear current-voltage curve is determined by the assigned resistance, and
  combining the current-voltage characteristic curves, after the subtraction, by either adding currents as function of voltage, if the pair is connected in parallel, or adding voltages as function of current, if the pair is connected in series.

Example embodiments may relate to a computer program product for performing a method in accordance with embodiments of any of the aforementioned aspects of the present disclosure, when executed on a computer.

Example embodiments may also relate to a computer readable storage medium, and/or a transmission over a digital communication network, in which the storage medium and/or the transmission comprises a computer program product according to example embodiments of the present disclosure.

Example embodiments may also relate to a photovoltaic system simulation system comprising a processor programmed for carrying out a method in accordance with embodiments of any of the aforementioned aspects of the present disclosure.

The photovoltaic system simulation system may be adapted for evaluating a plurality of design configurations for implementing a photovoltaic system at a predetermined location.

The photovoltaic system simulation system may be adapted for evaluating a plurality of runtime reconfiguration options for reconfiguring a reconfigurable photovoltaic system.

For example, some embodiments may also relate to a reconfigurable photovoltaic system comprising a photovoltaic system simulation system in accordance with embodiments of the present disclosure, e.g. for deciding on settings of the knobs in the reconfigurable photovoltaic system.

Particular aspects are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
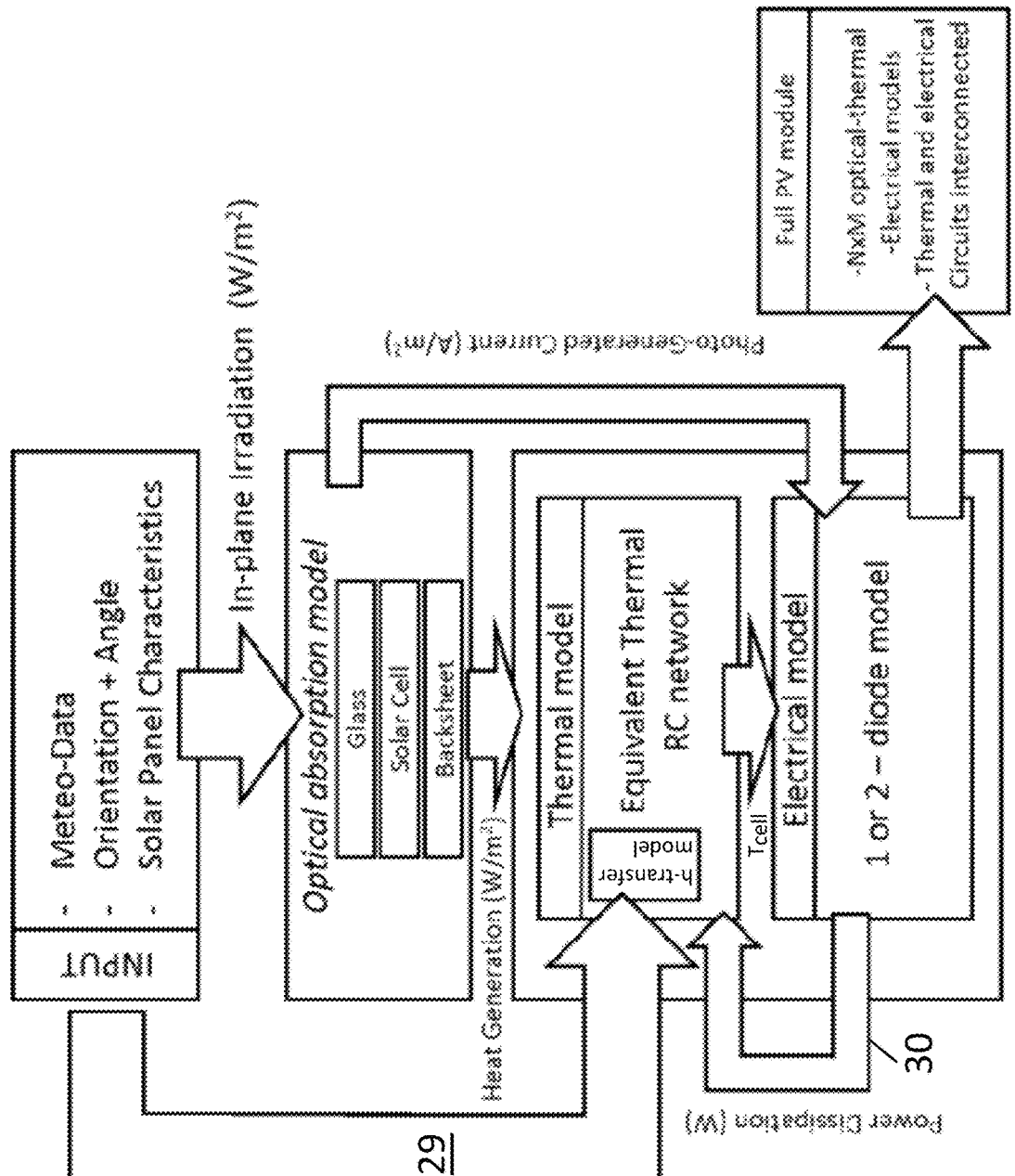
FIG. 1 illustrates a prior-art simulation model for simulating an optical-electrical-thermal model of a photovoltaic cell or group of cells, according to example embodiments.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent from this disclosure, in one or more embodiments.

Similarly it should be appreciated that in the description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

In a first aspect, the present disclosure relates to a computer-implemented method for estimating at least one performance measure and/or operating parameter of a photovoltaic system configuration under a sequence of temporally evolving operating conditions. For example, a method in accordance with embodiments of the first aspect of the present disclosure may estimate the performance measure and/or operating parameter of a plurality of such photovoltaic system configurations, e.g. alternative configurations being evaluated, for the sequence of temporally evolving operating conditions, e.g. such as to enable a selection of a configuration based on the performance measures and/or operating parameters. Where reference is made to a photovoltaic system, or a photovoltaic system configuration, this may refer to a photovoltaic module or photovoltaic module configuration respectively, but embodiments are not necessarily limited thereto. For example, a method in accordance with example embodiments may be adapted for simulating a photovoltaic system at different levels of integration, e.g. a plant, a system, a module or a part of a module.

Figure 2:
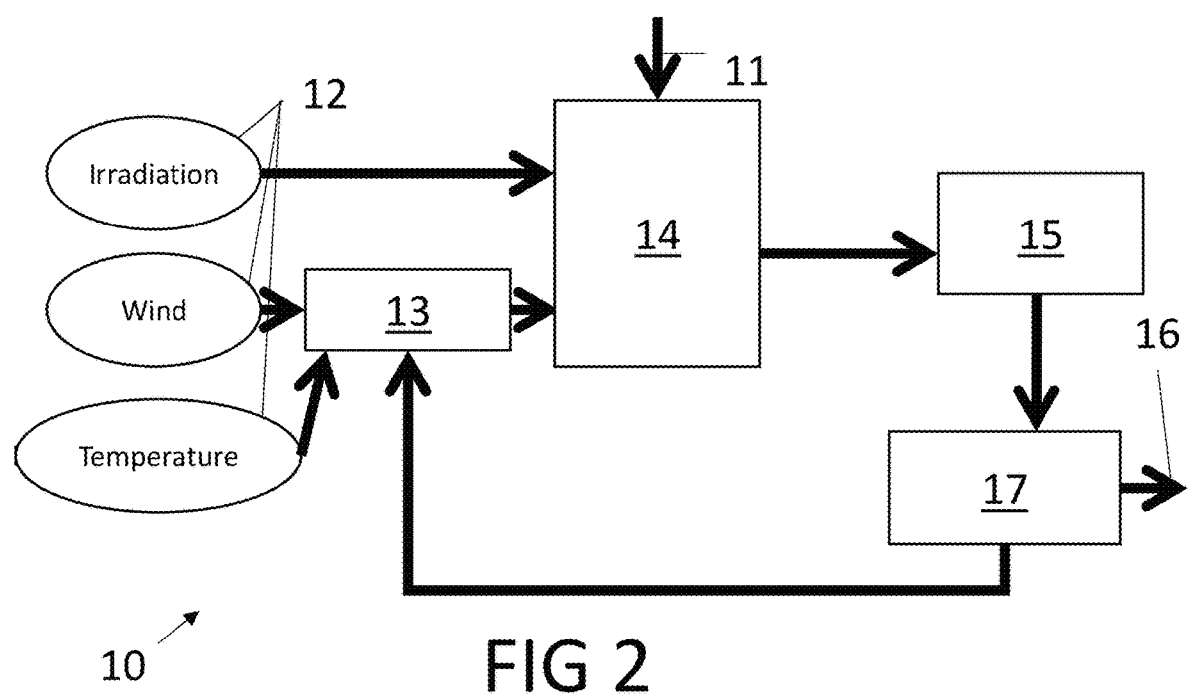
FIG. 2 illustrates a method of the first aspect of the present disclosure, according to example embodiments.

Referring to FIG. 2, an example method 10 in accordance with the first aspect of the present disclosure is illustrated.

The photovoltaic module configuration, or configurations, comprises a configuration (or different configurations) of a plurality of static and/or dynamically switchable parallel and/or serial interconnections between photovoltaic cell groups. The photovoltaic module configuration may also comprise one or more electrical converters. For example, different interconnections, e.g. serial, parallel and/or hybrid interconnections, between a plurality of cell strings, e.g. which may be implemented in a static design of the module or may be dynamically switchable in a reconfigurable photovoltaic module, may be formed in different configurations. The photovoltaic module configurations may also comprise different configurations of a plurality of electric converters, e.g. such that a cascade of converters, e.g. a plurality of local converters connected to a module-level converter, may be active in a configuration or only a single converter, e.g. a module-level converter, may be active in a configuration.

The photovoltaic cell groups may refer to cell strings, but may also refer to subsets of interconnected cells in a cell string, a single photovoltaic cell, a plurality of interconnected cell strings, or even entire sets of modules, e.g. as may be used in a photovoltaic rooftop installation or a photovoltaic plant.

Where reference is made to a cell string, this refers to a single coherent functional entity of photovoltaic cells that are electrically interconnected, e.g. statically and/or passively electrically interconnected, e.g. without dynamic, active and/or reconfigurable interconnections. For example, the cell string may be operable via a single pair of complementary terminals, e.g. a positive and a negative terminal.

The cell groups may be units, each unit comprising a plurality of photovoltaic cells that are electrically interconnected in a static manner, e.g. such as to form an electrical circuit of interconnected cells that remains static, as sub-unit of the module, over a plurality of photovoltaic module configurations. Furthermore, each unit may be only relatively weakly thermally coupled to other units in the module, e.g. relative to at least some relatively strong thermal couplings between cells within the same unit.

The method 10 comprises obtaining 11 a database that comprises a plurality of current-voltage characteristic curves (IV curves). The reference to "database", as well as the reference to "query request" further hereinbelow, does not necessarily imply any specific database structure, database functionality or database operation, except for what is explicitly disclosed or clearly implied hereinbelow. For example, the database may be embodied in a look-up table identifying the relationship between the query parameters and the current-voltage characteristic curves, e.g. by directly encoding the curves in the look-up table or by including a reference to storage location of the curve. For example, the database may be embodied by a filesystem structure that allows a look up of the query string in the form of at least part of a file system path, e.g. providing symbolic links or files containing explicit references to a storage location of the indexed current-voltage characteristic curve. The database may be embodied in the form of a relational database or another type of database, e.g. a key-value store, a document store, an object database and/or a tuple store. For example, the database may be adapted for providing "read" operations, e.g. query lookup operations, and do not necessarily provide functionality to provide "create," "update" and/or "delete" operations, e.g. the database may be substantially read-only. However, embodiments are not limited thereto, e.g. the database may provide access mechanisms to enable "create," "update," and/or "delete" operations as well. The database may be local database, e.g. integrated in or complementing a software package for execution in a stand-alone manner, or may be remote database, e.g. enabling access via a remote network service, such as a query transmitted over a network. The database may be consolidated in a single storage location, or may be distributed over a plurality of storage locations.

Each current-voltage characteristic curve is accessible, in the database, by a query request identifying a topology of a photovoltaic cell group, at least one internal temperature for the photovoltaic cells in the photovoltaic cell group and at least one cell irradiation for the photovoltaic cells in the photovoltaic cell group.

Where reference is made to a query request, this does not necessarily imply an operation that is reducible to an identity or equality operation in looking up the requested curve. For example, the result of the query request may return a closest match in the database, e.g. based on a distance measure defined over the query parameters, e.g. the topology, irradiations and temperatures. The distance may be a maximal difference in current or voltage, e.g. in one dimension, or it can be a two-dimensional distance metric based on, for example, an area between the I-V curves, e.g. a difference of the area under the curve. The distance metric may be based on a comparison, e.g. a difference, of a quantity determined by a functional relationship from the voltage and current defined by the pair of curves, such as a maximum difference in power. Furthermore, this distance measure may correspond to a distance measure used for clustering the I-V characteristic curves in the database during a step of creating and/or updating the database, e.g. in a method in accordance with the second aspect of the present disclosure, as is discussed in detail hereinbelow. Such closest match may be constrained by a thresholding operation, e.g. an approximate match may be returned only if the evaluated distance measure is less than an acceptable, e.g. predefined, threshold. Furthermore, the query may return a plurality of close matches, and the step of selecting may comprise performing an interpolation of the received results. Additionally or alternatively, real-valued query parameters, e.g. temperatures and/or irradiations, may be quantized, e.g. in formulating the query or in evaluating the query, e.g. such as to reduce an essentially infinite space of parameters to an enumerable, e.g. exhaustive, discrete space.

The database provides a mapping of the query request onto the plurality of current-voltage characteristic curves in the form of a many-to-one mapping such as to map a cluster of different topologies and/or different internal temperatures and/or different cell irradiations, e.g. a cluster of different query requests, onto a single representative current-voltage characteristic curve. For example, a cluster of different internal temperatures and/or different cell irradiations may be mapped onto a single representative current-voltage characteristic curve. A plurality of clusters may be mapped on a corresponding plurality of current-voltage characteristics. In some embodiments, current-voltage characteristic curves for a large number of different operating conditions for one or more topologies of photovoltaic cell groups, e.g. identified by at least one internal temperature and at least one irradiation for the one or more cells connected in accordance with the topology, can be efficiently stored and accessed.

The method further comprises receiving 12 data indicative of the sequence of temporally evolving operating conditions of the photovoltaic module as input. The data comprises, for each operating condition in the sequence, at least an irradiation, e.g. an irradiation map, an ambient temperature and a wind velocity, e.g. a wind direction and speed. The irradiation may be a single value, e.g. assuming a uniform irradiation of the simulated module, or a plurality of spatially organized values, e.g. a map defining an irradiation pattern over the module, for each entry of the sequence.

For example, the data may comprise a time series of ambient temperature, irradiation as function of location, e.g. over the simulated module, and wind or air flow parameters. For example, the data may encode dynamically changing irradiation, wind and temperature conditions over a predetermined time frame at a predetermined location for installing the photovoltaic module. Such data may be derived from measured data or inferred from weather data, e.g. weather statistics and/or weather models. The data may alternatively or additionally encode dynamically changing shading conditions, e.g. in the form of a time series of shading patterns encoded in the sequence of irradiation maps. The sequence of temporally evolving operating conditions, e.g. the time series, may cover a time frame ranging from less than a minute to more than a year, e.g., from less than a minute to a about a day, e.g. such that dynamic effects over a wide range of time scales can be analyzed. Likewise, the time granularity of the temporally evolving operating conditions may vary from less than a second to more than a month, e.g., from about a second to about an hour. The sequence may also comprise further parameters, e.g. such as a wind or air flow direction.

Thus, the method may receive, as input, a plurality, e.g. a number N, of several parameters such as irradiation maps, ambient temperatures and wind velocities.

The method comprises determining 13, for each of the photovoltaic cell groups, a sequence of internal temperatures corresponding to the sequence of operating conditions, taking at least the irradiation map, the ambient temperature and the wind velocity into account. A sequence of internal temperatures may be determined for each photovoltaic cell in the photovoltaic cell group, a single sequence of internal temperatures may be determined for all the photovoltaic cells in the photovoltaic cell group, or sequences of internal temperatures may be determined for a plurality of subgroups of the photovoltaic cells in the photovoltaic cell group.

The internal temperature of a cell is, in general, a function of the ambient temperature, the wind and the operating point of the cell, since the power which is not extracted electrically may be converted to heat. In accordance with example embodiments, this dependency on the operating point may be ignored, e.g. as a rough approximation. In some embodiments, this dependency may be solved explicitly, e.g. by repeating the steps of determining 13 the internal temperatures, selecting 14 the representative current-voltage curve from the database, calculating 15 at least one aggregate current-voltage characteristic curve and selecting 17 an operating point of the at least one aggregate current-voltage characteristic curve, in which the selected operating point is used to determine the operating point to be used as input for determining 13 the internal temperatures in a next repetition. Thus, the selected operating point may refine the determined internal temperatures until substantially converging to a stable set of internal temperatures and operating point.

Figure 4:
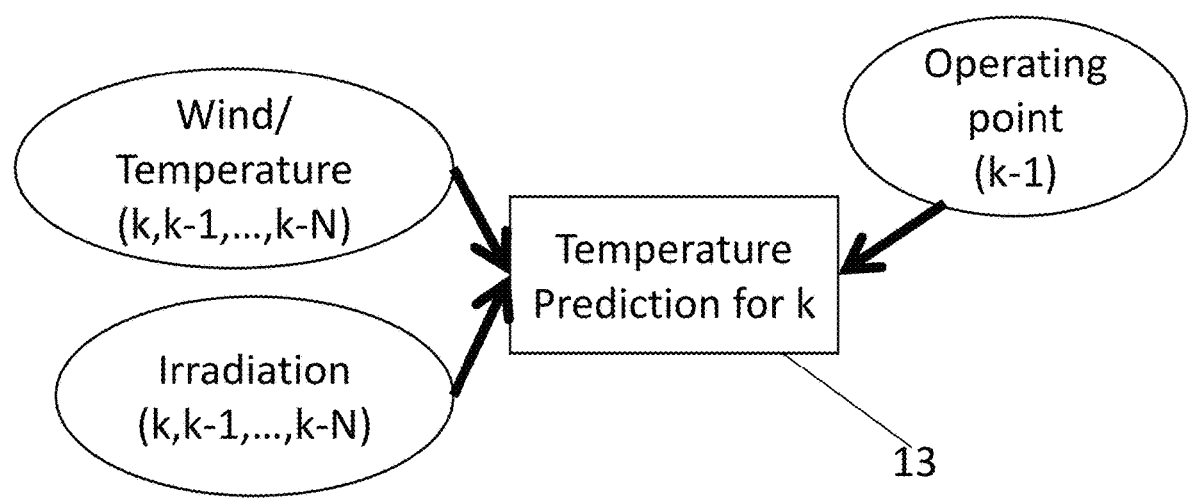
FIG. 4 schematically illustrates an internal cell temperature estimation approach, according to example embodiments.

In some embodiments, an operating point selected 17 for a time step of the sequence of temporally evolving operating conditions may be taken into account in determining 13 the internal temperatures for the next time step of the sequence of temporally evolving operating conditions. Thus, an operating point of a previous simulation step may be used to estimate the internal temperatures in a next simulation step of the sequence of evolving conditions to be simulated. For example, referring to FIG. 4, in a step of temperature prediction for the $k^{th}$ step of the sequence of evolving conditions to be simulated, the operating point or points determined in a previous step may be used, e.g. for the $(k-1)^{th}$ step of the sequence. After determining the internal temperatures, these may be used to select 17 an operating point, which can be used in a next $(k+1)^{th}$ step of the sequence. Furthermore, the value of the operating point OP(k) that is obtained for a step k of the sequence may be compared to the value of the operating point OP(k-1) that was obtained for a previous step (k-1) of the sequence. For example, if a relative and/or absolute difference between these values exceeds a predetermined threshold, the operating point OP(k) may be used to repeat the determining 13 of the internal temperatures for the same step k of the sequence. Furthermore, in such case this may be repeated until the operating point OP(k) has substantially converged.

The internal temperature of each cell depends on the external conditions and the operating point. The current irradiation level, e.g. the irradiation or irradiation map corresponding to the time step of the sequence for which the internal temperatures are being determined, is representative of the energy received by the cell at that time step. The operating point determines the amount of energy that is extracted from the cell in the form of electricity. The energy that is not extracted is substantially converted to heat and thus affects the internal temperature of the cell. The ambient temperature corresponding to the time step for which the internal temperatures are being determined, which was also received as input, acts as bias, e.g. forms a ground in the equivalent thermal circuit, while wind, as indicated by the wind data input for that time step, may cool down the cells.

Furthermore, the previous state or states and the module build-up caused by the materials of the module form further layers in the thermal network. The thermal network may act as a low pass filter, e.g. with about 2 or 3 different time constants for irradiation and wind changes. Such effects may be modelled explicitly through the parameters of the thermal network, e.g. by adding thermal capacitances and resistances for the various material layers. The wind effect may be modelled by a variable thermal resistance.

In some embodiments, the internal temperature for each photovoltaic cell c in each of the photovoltaic cell groups and for each time step k in the sequence of operating conditions may be determined by evaluating a state equation of an $N^{th}$ order thermal model that takes into account the present ambient temperature $T_{amb}(k)$ for that time step k, the previous N−1 ambient temperatures, the previous N−1 internal temperatures Tc that were determined for that cell, the present irradiation Irr(k) and the previous N−1 irradiations. The state equation may comprise a separable term for taking the wind into account, e.g. in accordance with:

$$T_c(k)=f(T_{amb}(k,k-1,\ldots,k-N),T_c(k-1,\ldots,k-N),Irr(k,k-1,\ldots,k-N),OP(k-1))+g(wind)$$

or the state equation may depend implicitly on the wind, e.g. in accordance with:

$$T_c(k)=f(T_{amb}(k,k-1,\ldots,k-N),T_c(k-1,\ldots,k-N),Irr(k,k-1,\ldots,k-N),OP(k-1)),$$

where, for example, the filter parameters depend explicitly on the wind velocity.

Furthermore, it is to be noted that the time step increment of the sequence is not necessarily uniform. The irradiation or other environmental conditions may be non-uniformly distributed over the course of a day. Therefore, during some periods of the day, longer time steps may be used to increase efficiency and/or to reduce the computational complexity.

Depending on the time-frame considered for the simulation, e.g. the time range and time granularity of the sequence of evolving operating conditions, the internal temperature for each photovoltaic cell in each of the photovoltaic cell groups and for each time step in the sequence of operating conditions may be determined by a first-, a second- or a third-order low-pass filter having two inputs: the net heat, e.g. being the heat generated by irradiation minus the extracted power (e.g. determined by the operating point), and ambient temperature.

Figure 5:
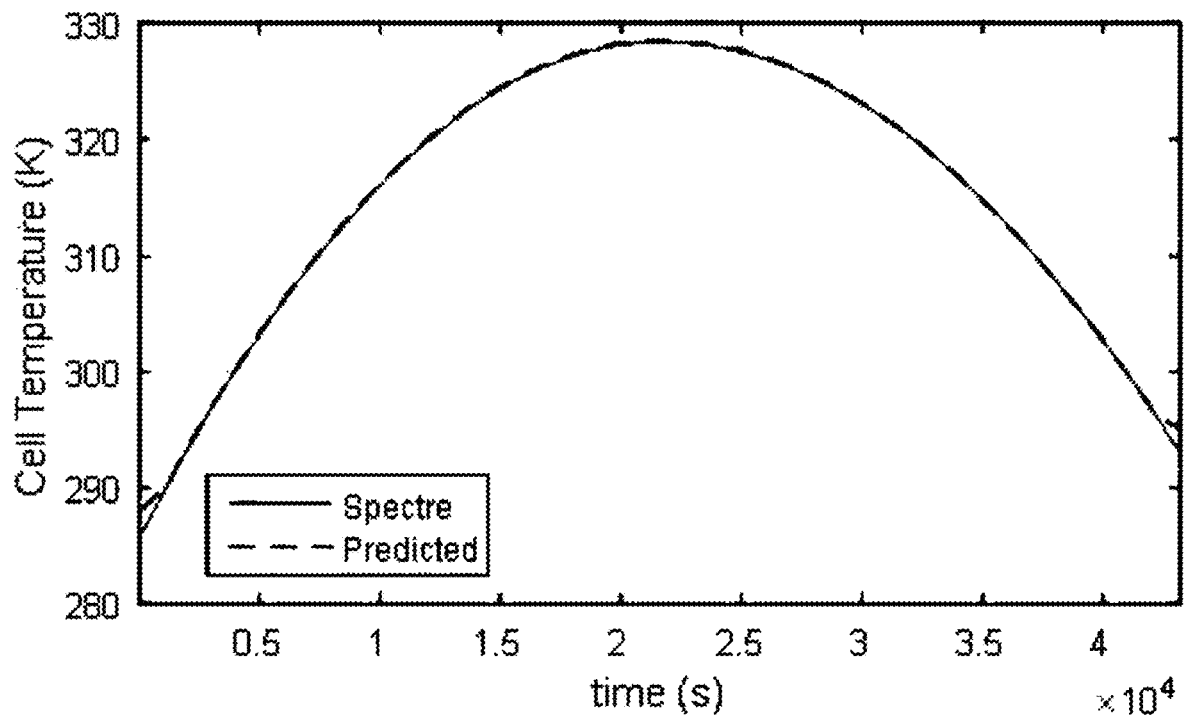
FIG. 5 shows a comparison between an internal cell temperature estimation approach and a prior-art temperature model, according to example embodiments.

FIG. 5 illustrates an example correspondence between predicted internal temperatures using a first-order low pass filter with a bilinear transform and a detailed reference simulation method "spectre". This example relates to a day simulation at a 1 second resolution. The operating point was considered predetermined, e.g. as obtained by prior simulations. This example shows that a low pass filter model can accurately model the internal cell temperatures. The error, observed in this example, between the filter model and the reference "spectre" simulation does not exceed 0.8% over a full day, and even remains under 0.15% when the early morning and late evening, when the energy input is particularly low, are excluded.

The internal temperature of each cell may also depend on the temperatures of neighboring cells. Since the internal temperatures of the cells may be included as searchable fields, e.g. keys, in the database, the thermal dependencies between a cell and its neighbors may be determined separate from a simulation, e.g. corresponding to the data stored in the database, of the optical-electrical behavior of the cells.

However, the effect of the surrounding cells on the internal temperature of the cells may be negligible, e.g. the effects of irradiation, wind, operating point and previous states and/or material layer effects may be substantially stronger than thermal coupling effects between neighboring cells. Therefore, in example embodiments, such effects may be explicitly taken into account in determining the internal temperatures, e.g. by including thermal resistances and/or capacitances in the thermal model, or may be neglected. Furthermore, the cell groups may be predetermined such that each cell group is sufficiently small, e.g. a cell string or subunit thereof, to assume, in an approximation, that uniform conditions over the cell group will dominate over the time sequence. The thermal effects of neighboring cells can also be included in the model by performing detailed simulations of a single cell group and observing the changes in temperature.

The method comprises selecting 14, for each of the photovoltaic cell groups, a representative current-voltage curve from the database by a query request based on a topology of the photovoltaic cell group, the irradiation map and the at least one internal temperature determined for at least one photovoltaic cell of the photovoltaic cell group.

For example, each cell group that is active in the photovoltaic module configuration may have a predetermined topology, e.g. a specific number of constituent photovoltaic cells, a geometric organization of the cells, e.g. a specific shape and/or other characteristics dining the group, e.g. cell types or materials. These topologies may extend across the boundaries between photovoltaic modules, and even beyond photovoltaic strings when an entire plant is modelled. Furthermore, a plurality of the cell groups may have the same topology. The curve for each cell group, at each time step of the sequence, may be retrieved from the database based on its cell group topology, e.g. by a topology identifier, on the irradiation that is incident on one or more cells in the group, e.g. as defined by the irradiation map received 12 as input, and the internal temperature of at least one cell in the group, e.g. as determined 13 by the method.

For example, by using the internal temperatures of the cells, e.g. an array of internal cell temperatures, as a query variable (or equivalently, by including this information in the database as a searchable field or set of fields), simulations of the thermal network, e.g. at least of the module-level thermal network, may be decoupled from an electrical-optical simulation of the cell groups, e.g. which can generate the data stored in the database.

The method also comprises calculating 15 at least one aggregate current-voltage characteristic curve for each step of the sequence of evolving operating conditions. The reference to "aggregate" in the present description only implies that an operation is performed on the input of the operation, i.e. on the selected current-voltage curves, to group together, combine, transform or otherwise manipulate this input to produce a single output, i.e. an aggregate current-voltage characteristic curve.

For example, when current-voltage characteristic curves have been selected to represent a state of each of the cell groups under a transient operating condition corresponding to a time step of the sequence of operating conditions, the module configuration may have the cell groups to be interconnected in a particular manner. For example, the cell groups may be connected in parallel or in series in accordance with respectively two different module configurations. Furthermore, depending on the type of connection, the design-time and the specific run-time instantiation of the module, the interconnecting resistances between two cell groups, e.g. cell-strings, can be different. Each selected representative current-voltage characteristic curve may take internal resistances between a complementary pair of external terminals into account, e.g. by which pair of terminals the cell group can be connected to other elements of the module, e.g. the pair of terminals being a positive and a negative terminal between which a cell-string is formed. The internal resistances are common for all cell groups having the same topology, e.g. cell-strings having the same size and shape, and for all run-time instances of the module.

Figure 3:
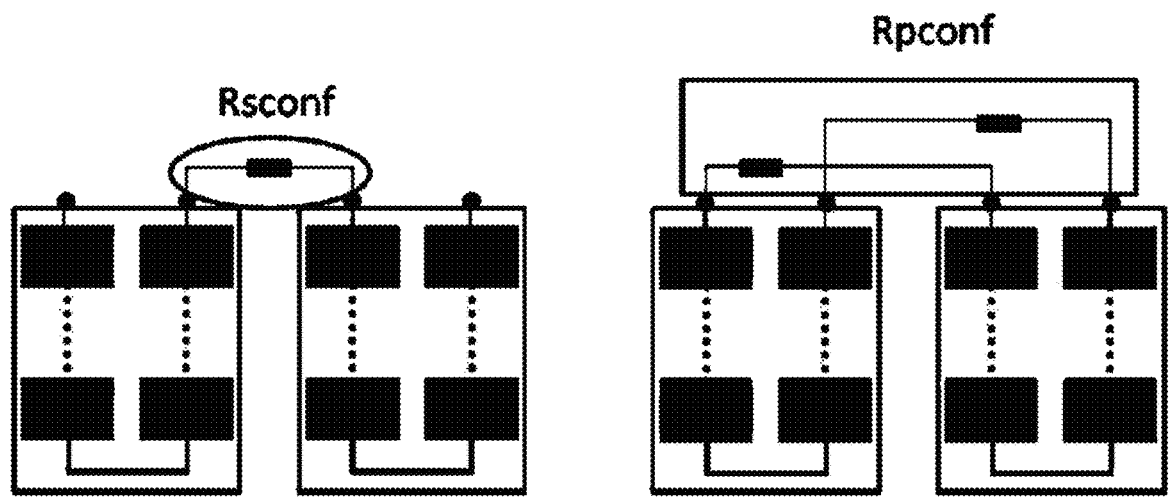
FIG. 3 illustrates a serial and a parallel interconnection of two cell strings, according to example embodiments.

Calculating 15 the at least one aggregate current-voltage characteristic curve for each step of the sequence of evolving operating conditions may comprise, e.g. in each step of the sequence, transforming at least one pair of the selected current-voltage characteristic curves by taking a serial interconnection resistance Rsconf between the corresponding pair of cell groups or a parallel interconnection resistance Rpconf between the corresponding pair of cell groups into account, e.g. as illustrated in FIG. 3. Regardless of the type of interconnection between each pair of cell groups, e.g. in combining a pair of selected current-voltage characteristic curves, at least one additional resistance (e.g. Rsconf,Rpconf) may be taken into account.

Calculating the at least one aggregate current-voltage characteristic curve for each step of the sequence may comprise calculating an aggregate current-voltage characteristic curve for each converter, e.g. each electrical converter that is active in accordance with the module configuration. An example approach to calculating the aggregate current-voltage characteristic curve is illustrated hereinbelow in pseudo-code:

```
For i=1 to N (where N refers to the number of active local converters)
    while X_i not empty (where X_i refers to the cell groups connected to
        converter i)
    for a pair of curves in X_i OR intermediate curves
        if type-of-connection==series
            take Rsconf into account by transforming one of
                the pair of curves: V'=V-I*Rsconf
            linear interpolation to create common current points
            add the voltages to generate an intermediate curve
        if type-of-connection==parallel
            take Rpconf into account by transforming one
                or both of the pair of curves: (V'=V-I*Rpconf)
            linear interpolation to create common voltage points
            add the currents to generate an intermediate curve
        remove pair of curves from X_i
        if X_i is empty, output the remaining intermediate curve,
            else add intermediate curve to X_i
    end while
end for
```

For example, for a series connection, in which a cell group corresponding to the first curve of the pair of curves is connected to a cell group corresponding to the second curve of the pair of curves, either one of the curves (I; V) may be transformed into (I; V−I*Rsconf). Such a transformation may also be distributed over both curves, e.g. (I1; V1−I1*Rsconf*f) and (I2; V2−I2*Rsconf*(1−f), where 0<f<1.

Figure 20:
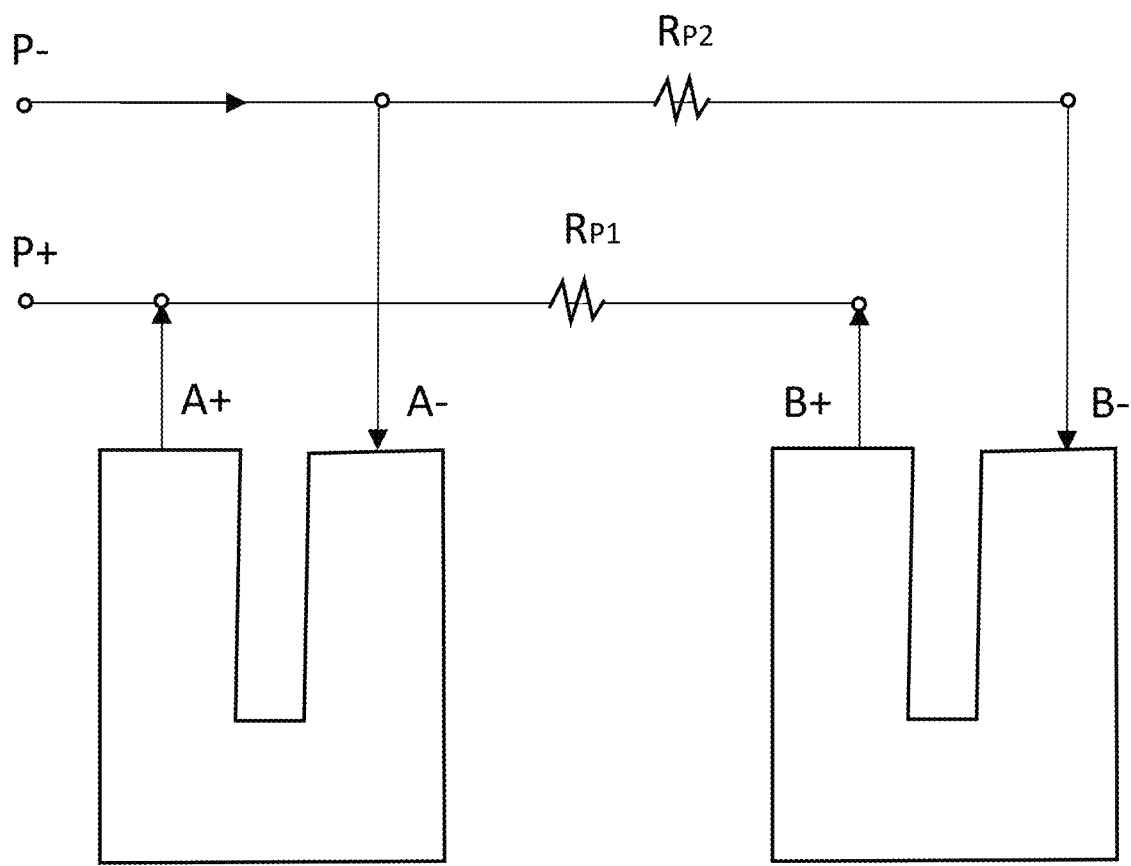
FIG. 20 shows a first parallel connection of two photovoltaic cell groups, according to example embodiments.

For example, for a parallel connection, as illustrated in FIG. 20, the output terminals P+, P− of the pair of cell groups may correspond to the location of output terminals of a first cell group A+, A−. The curve (I;V) of the second cell group, which is logically most distal from the output terminals of the pair of cell groups, may be transformed into (I;V−I*Rpconf), where Rpconf represents a resistance along each interconnecting leg, e.g. Rpconf=$R_{P1}$+$R_{P2}$.

Figure 21:
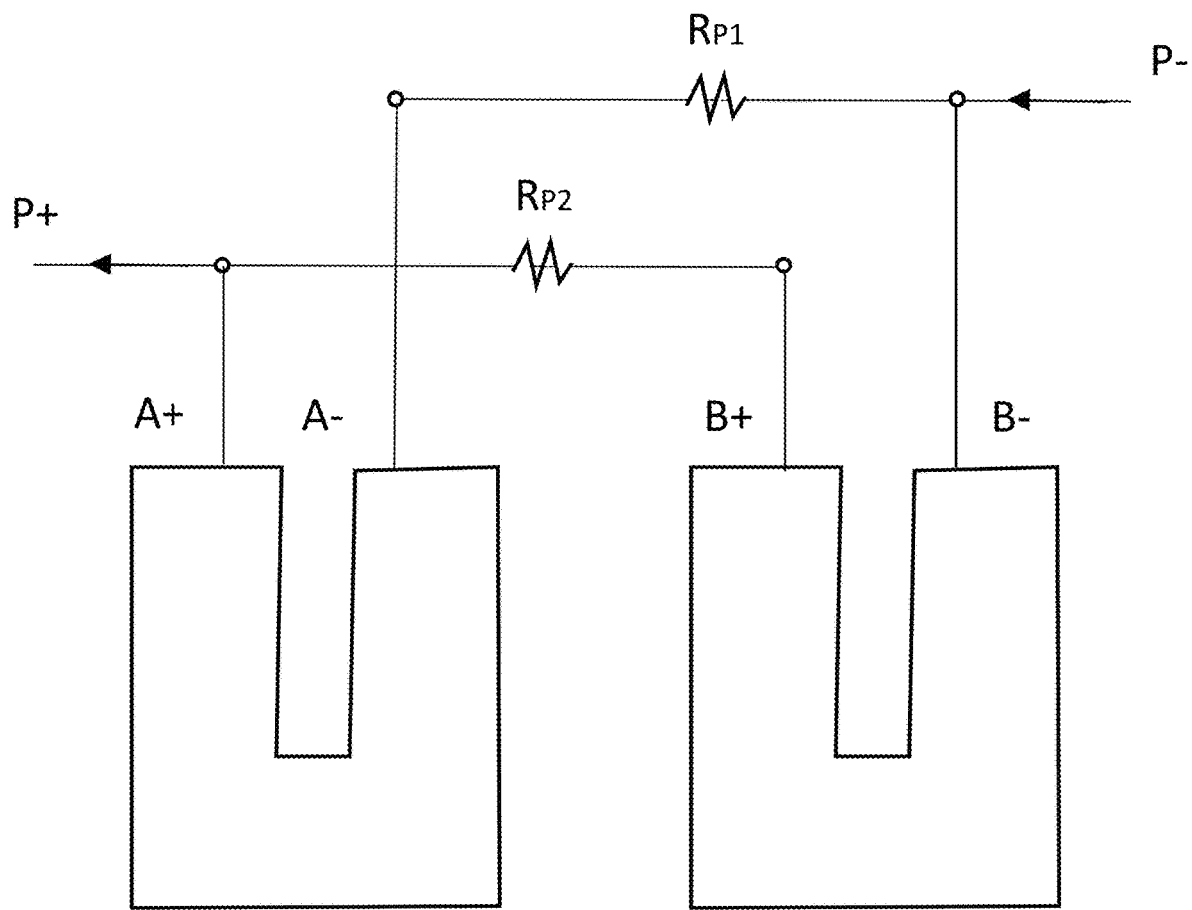
FIG. 21 shows a second parallel connection of two photovoltaic cell groups, according to example embodiments.

In another example, for a parallel connection, as illustrated in FIG. 21, the output terminals P+, P− of the pair of cell groups may correspond to the locations of an output terminal of the first cell group and of an output terminal of the second cell group respectively. The curve (I;V) of the first cell group may be transformed into (I;V−I*$R_{P2}$), and the curve (I;V) of the second cell group may be transformed into (I;V−I*$R_{P1}$). Thus, the resistance $R_{P2}$, $R_{P1}$ for each leg of the parallel connection may be taken into account by transforming, respectively, the curve of the cell group that is most distal from the output terminal of the pair of cell groups for that leg.

For example, calculating the at least one aggregate current-voltage characteristic curve for each converter may comprise selecting a pair of cell groups connected to that converter in accordance with the module configuration, determining whether the pair of cell groups are connected in series or in parallel to each other, subtracting a linear current-voltage curve from either (or both) of the current-voltage characteristic curves selected for that pair of cell groups, in which a voltage over current ratio of the linear current-voltage curve is determined by a resistance assigned to the serial or parallel connection between the pair of cell groups in accordance with the module configuration, and combining the current-voltage characteristic curves, after having applied the linear I-V curve subtraction, by either adding currents as function of voltage or adding voltages as function of current, for the interconnection being either parallel or serial.

Calculating the at least one aggregate current-voltage characteristic curve may also comprise performing an interpolation when adding currents as function of voltage or adding voltages as function of current, such that the quantities being added are defined over the same instances of the argument variable, i.e. of voltage and of current respectively.

For example, when the two cell groups (and/or intermediate entities obtained in previous iterations by combining cell groups) are connected in series, these groups share the same current. In order to combine the two individual curves in a series connection, points of the two curves with the same current may be located. For these points, where the current is the same, the two voltages may be added. Missing points in each curve may be computed by interpolation, such as linear interpolation. Near the maximum power point, parabolic interpolation may be used, e.g. instead of linear interpolation. However, example embodiments are not limited to any specific type of interpolation. Performing this process for all points of the two curves where the current is equal may thus produce an I-V curve that is representative of the serial combination.

When the two cell groups (and/or intermediate entities obtained in previous iterations by combining cell groups) are connected in parallel, these groups share the same voltage across their corresponding terminals. In order to combine the two individual curves in a parallel connection, points of the two curves with the same voltage may be located. For these points, where the voltage is the same, the two currents may be added. Missing points in each curve may be computed by interpolation, such as linear interpolation. Near the maximum power point, parabolic interpolation may be used, e.g. instead of linear interpolation. However, example embodiments are not limited to any specific type of interpolation. Performing this process for all points of the two curves where the voltage is equal may thus produce an I-V curve that is representative of the parallel combination.

Calculating the at least one aggregate current-voltage characteristic curve for each converter may comprise selecting a pair of cell groups connected to that converter in accordance with the module configuration, and reducing this pair to a an intermediate single entity, having the combined current-voltage characteristic curve assigned thereto. The at least one aggregate current-voltage characteristic curve for each converter may be calculated by repeatedly reducing pairs of cell groups and/or intermediate entities, obtained by earlier executed reductions, until a single intermediate entity remains. The combined voltage-current characteristic curve of the single remaining intermediate entity may be the aggregate current-voltage characteristic curve obtained for the converter.

The aggregate current-voltage characteristic curve for a converter connected to plurality of cell groups that are interconnected by a hybrid connection, e.g. not by solely chaining the groups in series or connecting the groups in parallel, may also be obtained by repeatedly reducing pairs of serially or parallelly connected subunits until a single representative I-V curve is obtained. For example, four cell-strings connected to the same local converter may be connected in pairs in series and then in parallel, e.g. [1+1]/[1+1]. However, such combination can be made by first reducing the serially connected cell-strings to intermediate I-V curves and then combining both intermediate I-V curves. However, the extent to which such a reduction is applied may depend on a trade-off between accuracy, e.g. of an energy-yield estimation, versus the computational complexity. Such trade-off may for example be determined on the basis of the requirements of a specific application.

As described hereinabove, the resistive elements representative of the interconnection of cell groups are not included in bottom-up thermo-electrical-optical simulations, but may be taken into account in a combination process for combining current-voltage curves, e.g. which may be (pre) computed by such bottom-up simulations. Even if the current-voltage curves are represented in a discrete approximation, i.e. by non-continuous data, when a range of potential resistive values that can be added in the combination process is known, a voltage window and step, e.g. a resolution of the discretization, can be determined, e.g. to account for a worst case of accuracy degradation by transforming the discretized curve in the combination process. For example, introducing resistive elements in the pre-simulated current-voltage curve of a cell-string may be constrained to a loss in accuracy level of less than 0.05%.

The method may comprise selecting 17 an operating point of the at least one aggregate current-voltage characteristic curve, e.g. the aggregate current-voltage characteristic curve determined for each active local converter or for the module converter, for each step of the sequence of operating conditions, e.g. in accordance with a predetermined objective function. Each aggregate current-voltage characteristic curve may be indicative of the current-voltage relation at the input of a corresponding converter, e.g. a local converter or module converter. These aggregate I-V curves may thus enable the selection of an operating point for each active local converter or for the module converter, for the specific run-time conditions of the module for different objectives, and allows a power calculation for each time step of the sequence. For example, selecting 17 the operating point may take a predetermined objective into account. Depending on the objective of the optimization, different operating points can be selected. For example, if the objective is a maximization of the energy output, the maximum power point of the aggregate current-voltage characteristic curve may be selected as operating point. If the objective is a maximization of another aspect, e.g. encoded in the form of an objective function to be maximized, for each point of the aggregate current-voltage characteristic curve, the value of the objective function may be calculated, and the point for which the maximum value of the objective function was reached may be selected as operating point. This may be equivalently formulated in terms of a minimization of a cost function instead of a maximization of an objective function. For example, other than energy, an objective may consist of, or comprise, a reliability measure or a temperature stability measure.

The best operating point for the I-V curves corresponding to a plurality of local converters, e.g. in a reconfigurable topology, does not necessarily correspond to the maximum power point (MPP) of a single local converter. In a reconfigurable module, or, in general, in a reconfigurable topology (e.g. a reconfigurable system that comprises a plurality of modules), or at least in a run-time instance thereof wherein local converters are active, a goal might be to maximize the output power of the entire module. Particularly, selecting the MPP as the best operating point for each individual local converter may not necessarily lead to the best overall power production. For example, converter efficiency as a function of operating voltage and conversion ratio, as well as resistive losses after the local conversion stage, can affect the total power reaching the module converter. However, since the I-V curves are available at the inputs of the local converters, e.g. as the aggregate current-voltage characteristic curves, different operating points can be chosen for a fast multi-objective analysis with accuracy.

The method further comprises outputting 16 at least one performance and/or operating parameter for each step of the sequence of operating conditions.

Outputting 16 the at least one performance measure and/or operating parameter may comprise outputting the operating point for each step, outputting the objective function value attained for the operating point and/or outputting the at least one aggregate current-voltage characteristic curve. For example, outputting 16 the at least one performance measure and/or operating parameter may comprise outputting an energy yield, an operating point and/or a current-voltage characteristic curve, e.g. an operating point (and/or current-voltage characteristic curve) for each time step and for each converter that is active in accordance with the module configuration, e.g. for each active local converter and/or for a module-level converter. For example, when the local converters are active, the operating points at the input of each local converter may be outputted, and when only the module converter is active, the operating point at the input of the module converter may be outputted.

Some embodiments may allow an efficient exploration of different topologies for photovoltaic modules consisting of a same combination of photovoltaic cell groups, e.g. having a same arrangement of cell-strings, e.g. having the same cell-string layout. Fast simulation results can be obtained for different interconnection schemes of the groups, e.g. of the cell-strings, such as series, parallel or hybrid interconnection configurations, for a different number of local converters, and/or for different types of wires and switches, e.g. depending on the connection between cell-strings, the resistive elements of the interconnection may vary. In accordance with embodiments, reusability is provided that can enable a speedup of the simulation process.

Furthermore, the method may comprise determining an output current-voltage characteristic curve for each converter, e.g. by taking the aggregate current-voltage characteristic curve at the input of the converter and a technical specification of the converter into account. The method may also comprise calculating a global aggregate current-voltage characteristic curve for each step of the sequence of evolving operating conditions, by combining the plurality of output current-voltage characteristic curves for each of the local converters. This combining may be executed substantially as described hereinabove for combining the characteristic curves of the cell groups, e.g. may take additional serial and/or parallel resistances into account and may repeatedly combine pairs of such output current-voltage characteristic curves, based on their serial or parallel relation in accordance with the module configuration, until a single representative aggregate curve is obtained.

In a second aspect, the present disclosure relates to a computer-implemented method for generating and/or updating a database comprising a plurality of current-voltage characteristic curves, e.g. each current-voltage characteristic curve being accessible in the database by a query request identifying a topology of a photovoltaic cell group, at least one internal temperature for the photovoltaic cells in the photovoltaic cell group and at least one cell irradiation for the photovoltaic cells in the photovoltaic cell group. The method comprises simulating, for at least one combination of a topology of a photovoltaic cell group, at least one internal temperature for the photovoltaic cells in the photovoltaic cell group and at least one cell irradiation for the photovoltaic cells in the photovoltaic cell group, a model of the photovoltaic cell group to provide a current-voltage characteristic curve representative of that combination. The method comprises clustering the current-voltage characteristic curves to identify at least one plurality of similar current-voltage characteristic curves, and generating a many-to-one mapping in the database to map query requests that correspond to each of the at least one plurality of similar current-voltage characteristic curves onto a single representative current-voltage characteristic curve for that plurality of similar current-voltage characteristic curves, each query request identifying a topology of a photovoltaic cell group, at least one internal temperature for the photovoltaic cells in the photovoltaic cell group and at least one cell irradiation for the photovoltaic cells in the photovoltaic cell group. Thus, the generated, or updated, database can provide a mapping of the query request onto the plurality of current-voltage characteristic curves in the form of a many-to-one mapping that maps a cluster of different topologies and/or different internal temperatures and/or different cell irradiations onto a single representative current-voltage characteristic curve.

A method in accordance with embodiments of the first aspect of the present disclosure may comprise a step of generating or updating the data in accordance with an embodiment of the second aspect of the present disclosure.

Obtaining the database in a method in accordance with the first aspect of the present disclosure may comprise generating the database in accordance with an embodiment of the second aspect of the present disclosure.

Selecting a representative current-voltage curve from the database in a method in accordance with the first aspect of the present disclosure may comprise updating the database in accordance with a method in accordance with the second aspect of the present disclosure, e.g. if the query request generated in the step of selecting does not retrieve a result, i.e. the requested current-voltage curve. For example, the step of updating may comprise generating a database entry based on the query request, e.g. based on the topology of the photovoltaic cell group, the irradiation map and the internal temperature(s) determined for at least one of the photovoltaic cells of the photovoltaic cell group. The step of updating may comprise generating a curve in the database, referencing an existing curve in the database by a key corresponding to the query request, e.g. adding to an existing cluster in the database or generating a cluster in the database.

Figure 6:
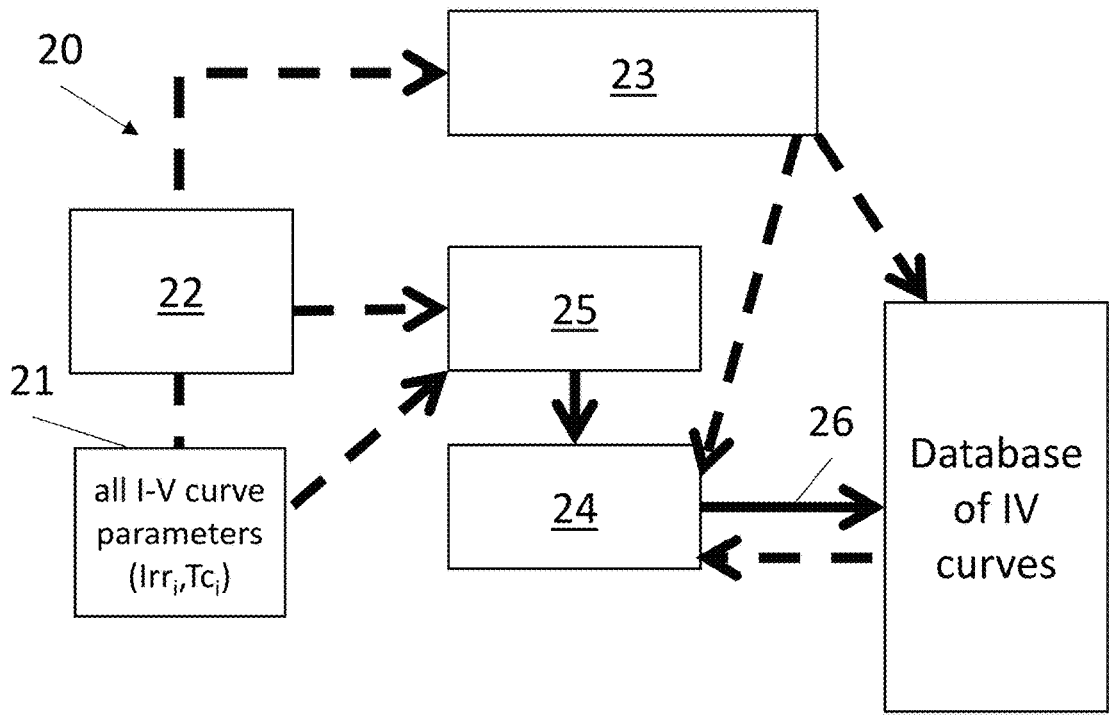
FIG. 6 illustrates a method in accordance with a second aspect of the present disclosure, according to example embodiments.

Referring to FIG. 6, a method 20 in accordance with embodiments of the second aspect of the present disclosure comprises, for at least one combination (e.g. at least one combination in the case of updating of the database, or at least a plurality of such combinations in the case of generating the database) of a topology of a photovoltaic cell group, at least one internal temperature for the photovoltaic cells in the photovoltaic cell group and at least one cell irradiation for the photovoltaic cells in the photovoltaic cell group, simulating 25 a model of the photovoltaic cell group to provide a current-voltage characteristic curve representative of that combination.

Simulating 25 the model may comprise simulating an electrical-optical model or an electrical-thermo-optical model of the photovoltaic cell group configured in accordance with the topology and taking the cell internal temperatures and cell irradiations into account.

Simulating 25 the model may comprise simulating a model in accordance with a method, or at least part of such method, as disclosed in EP 2 998 756. The contents of this patent defining the model are hereby incorporated by reference. However, embodiments are not necessarily limited to this particular model, but may also comprise simulating another electrical-thermo-optical model. FIG. 1 represents a general framework for simulating a photovoltaic cell group that may be used, e.g. entirely or in part, for simulating the model. For example, parts of this model relating to the model dependence on meteorological data may be ignored for the purpose of simulating 25 the photovoltaic cell group. For example, instead of taking wind speed, wind direction and ambient temperature into account 29 in evaluating the model, e.g. as illustrated in FIG. 1, the optical-thermal-electrical model may be directly evaluated for the internal cell temperatures and irradiations received as parameters. Likewise, the thermal component of the model may be simplified or ignored, e.g. presumed to be accounted for by the parameter definition of internal cell temperatures. Furthermore, a feedback loop 30 of the power dissipation to take the dissipated heat into account in the thermal model may be simplified or ignored.

The model may comprise a detailed electrical-thermo-optical model that is adapted for incorporating fine-grained transient irradiances and internal temperatures.

For example, the current-voltage characteristic curve may be generated by simulating a model over a short time period, e.g. in the range of 100 ms to 1 hour.

The method may also comprise determining a compact representation of each current-voltage curve obtained by the step of simulating. For example, such compact representation may be used in further steps of the method, e.g. in a clustering step. Furthermore, such compact representation may be stored in the database, e.g. to increase storage, memory bandwidth and/or transmission bandwidth efficiencies. Determining the compact representation may comprise determining a curve segment of the characteristic curve, where the segment is substantially linear, e.g. where a deviation measure expressing a deviation of the curve segment from a straight line is below a predetermined tolerance threshold, and discarding points on the curve in between the end-points of this curve segment. Determining the compact representation may also comprise determining points and/or coordinates of interest, such as a frequent operating point, an open circuit voltage and/or a short-circuit current, and including such points explicitly in the compact representation.

For example, pseudo-code for a step of determining the compact representation is provided hereinbelow:

```
For all Curves
    for points (point1,point2) in curve
        if the curve is linear in the range [point1, point2] , and deviates
        substantially from linearity near point1 and point2 outside the range
        [point1,point2],
            save point1, point2
        end
    end
    For point1 in curve
        if point1 frequent operating point
            save point1
        end
    end
end
```

For example, the European patent application EP 2 846 364 discloses approaches for determining a compact representation of a current-voltage characteristic curve. Particularly, any method for decimating or reducing the number of sample points of at least one parameter that are necessary to identify a characteristic curve, e.g. corresponding to the subject of the patent application referred to hereinabove, as disclosed therein may be used in a step of determining a compact representation of a current-voltage characteristic curve in accordance with example embodiments.

The method in accordance with embodiments of the second aspect of the present disclosure may comprise generating 21 a plurality of combinations by an exhaustive enumeration of, or sampling from, a parameter space defined by at least one internal temperature for a photovoltaic cell in the photovoltaic cell group and at least one cell irradiation for a photovoltaic cell in the photovoltaic cell group, e.g. a parameter space defined by the topology, internal cell temperatures and cell irradiations.

Thus, a plurality of combinations of topology, internal cell temperatures and cell irradiations may be determined for which entries in the database are to be created and/or updated.

For example, a cell group, in accordance with a predetermined topology, may comprise a number n of cells. The irradiation may be quantized in x levels and the internal temperatures may be quantized in y levels. Thus, the number of operating conditions per cell may be k=x*y, where * represents the scalar multiplication operator. The number of operating conditions per cell group, e.g. for this particular cell group topology, is therefore ((n k)), i.e. the number of n-combinations with repetitions out of k possible states.

The method may also comprise selecting 22 the at least one combination for the step of simulating 25 from the generated plurality of combinations by eliminating improbable and/or infeasible and/or redundant combinations from the plurality of combinations.

The method may comprise, for combinations of the generated plurality of combinations that were eliminated for being improbable, providing a rough estimate of the current-voltage characteristic curve instead of simulating the current-voltage characteristic curve using the model.

This step of selecting 22 may comprise determining a likelihood or feasibility criterion for each generated combination, e.g. a likelihood of occurrence in practical use cases or a feasibility of the combination. The method may comprise determining whether the likelihood or feasibility criterion is below a threshold, and, if the criterion is below the threshold, providing a rough estimate of the current-voltage characteristic curve instead of simulating the current-voltage characteristic curve using the model.

For example, while all possible operating conditions for each cell group topology, e.g. the combinations generated in a step 21, may be linked to a current-voltage characteristic curve in the database, in practice, it may provide the curve for infrequently occurring situations by a conventional crude overestimate, crude underestimate and/or approximation, e.g. to avoid spending too much computation time on such rare situations. Therefore, computational resources can be focused on exploring a representative subset of situations that are deemed more commonly applicable, more feasible and/or more useful in practice. For example, the likelihood or feasibility criterion may be determined by a profiling and/or sampling of realistic shading and environmental conditions at a location of the module or plant and/or over a range of such representative locations. Detailed meteorological conditions may be available at a large number of representative locations in a sufficiently detailed fine-grain format, e.g. up to sampling periods of a second, to enable a sufficient sampling of representative conditions in practice. Even in cases where the available granularity of reference meteorological data may be rather crude, a sampling of representative conditions may still be achievable.

While each group of cells may have a semi-infinite number of different operating conditions, e.g. which can be reduced to large but finite set by setting temperature and irradiation quantization levels, the number of substantially distinct current-voltage curves that can be produced is finite. The selection step 22 may reduce the number of different operating conditions to be simulated in detail, and, if different operating conditions of a cell-string lead to similar IV curves, these operating conditions can then be clustered 24.

A first reduction of the large parameter space over which curves may be defined, may be achieved in the selection step 22 by excluding operating conditions which are equivalent to others or which are unrealistic based on the design instantiation of the module. For example, in a selection 22 step, e.g. a pruning step, realistic combinations of the query parameters may be selected and/or unrealistic combinations of the query parameters may be excluded. For example, the pseudo-code hereinbelow illustrates selection 22:

```
CURVES ={ } (parameters of curves to be selected)
For all possible sets of irradiation [Irr(i)] and internal Temperatures [Tc(i)]
    if (permutation of [Irr(i),Tc(i)] ∈ CURVES) then discard
    else if large differences (unrealistic) in Tc(i) then discard
    ... (other conditions may be added to discard unrealistic conditions)
    else put [Irr(i),Tc(i)] in curves
Return CURVES
```

Apart from permutation testing and/or evaluating large differences in cell temperatures over the cell group, the selection may also comprise other criteria. Furthermore, the selection (or pruning) may depend on the location of the installation, e.g. may take information into account about a location for which module configurations are to be simulated using the database. However, the selection (or pruning) process may also be independent of the location, e.g. to generate a general purpose database that can be used over a wide range of module simulations. Nonetheless, numerous parameter combinations may still be excluded based on being universally unrealistic, e.g. very complex irradiation patterns, such as, for example, checkerboard shading patterns.

For example, the selection 22 may comprise performing permutations of the cells, i.e. jointly permutating the internal temperatures and irradiations assigned to the cells, and only withholding one representative combination of temperatures and irradiations as representative for the set of permutations. Such an approach may be limited to those permutations which would lead to physically equivalent models, e.g. permuting cell parameters for cells which have substantially the same electrical characteristics and/or for which a same or similar thermal response can be assumed. For example, in some embodiments, all cells in a group, e.g. in a cell string, may have the same electrical characteristics and may be assumed to be interchangeable, e.g. at least in a first approximation.

Selecting 22 the at least one combination from the plurality of generated combinations may also comprise eliminating 23 combinations, from the plurality of generated combinations, for which the current-voltage characteristic curve can be represented by a parameterized transformation of another current-voltage characteristic curve corresponding to another of the plurality generated combinations. The method may also comprise determining the current-voltage characteristic curve for the eliminated combinations by the parameterized transformation.

For example, a method 20 in accordance with embodiments of the second aspect of the present disclosure may comprise selecting combinations of the query parameters for which the current-voltage characteristic curve can be obtained by a transformation, e.g. a linear transformation, e.g. a scaling, of a representative current-voltage characteristic curve determined for one of the selected combinations. For example, the current-voltage characteristic curves for a set of combinations of the query parameters can be parametrized, e.g. by a representative current-voltage characteristic curve and a parameter value assigned to each combination, e.g. a scaling parameter.

Figure 7:
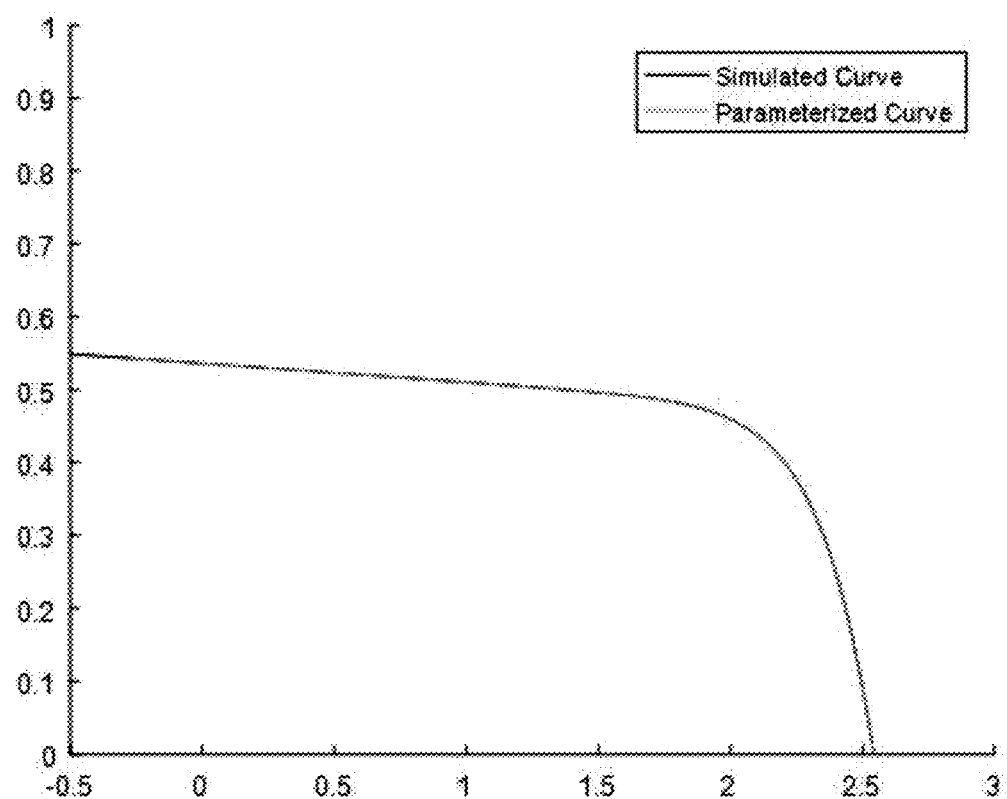
FIG. 7 shows an approach for obtaining an I-V curve for a cell-string with a 100 W/m$^2$ uniform irradiation by transforming an I-V curve for the cell-string with a 1000 W/m$^2$ uniform irradiation, both at a corresponding uniform temperature of 300K, according to example embodiments.

For example, for uniform operating conditions of a cell-string, e.g. in which each cell of the cell-string is at the same internal cell temperature and receives the same incident irradiation, the short-circuit current may be proportional to the irradiation level. Therefore, the current-voltage characteristic curve for a uniform temperature T1 and a uniform irradiation G2 can be derived from the current-voltage characteristic curve for the uniform temperature T1 and a different uniform irradiation G1. In this example, the curve for the uniform conditions (T1, G2) can be computed from the curve for the uniform conditions (T1, G1) by calculating a difference in short-circuit current, due to the difference in the irradiation level, and a voltage shift by computing the voltage drop in a series resistance of the cell-string from the difference in the current. In FIG. 7, an example application of this approach is illustrated to obtain a curve for a cell-string with a 100 W/m² uniform irradiation by transforming the curve for the cell-string with a 1000 W/m² uniform irradiation, both at a corresponding uniform temperature of 300 K. A correspondence between the simulated I-V curve and the curve derived from the other operating conditions by parametrization of the curve is shown.

Figure 8:
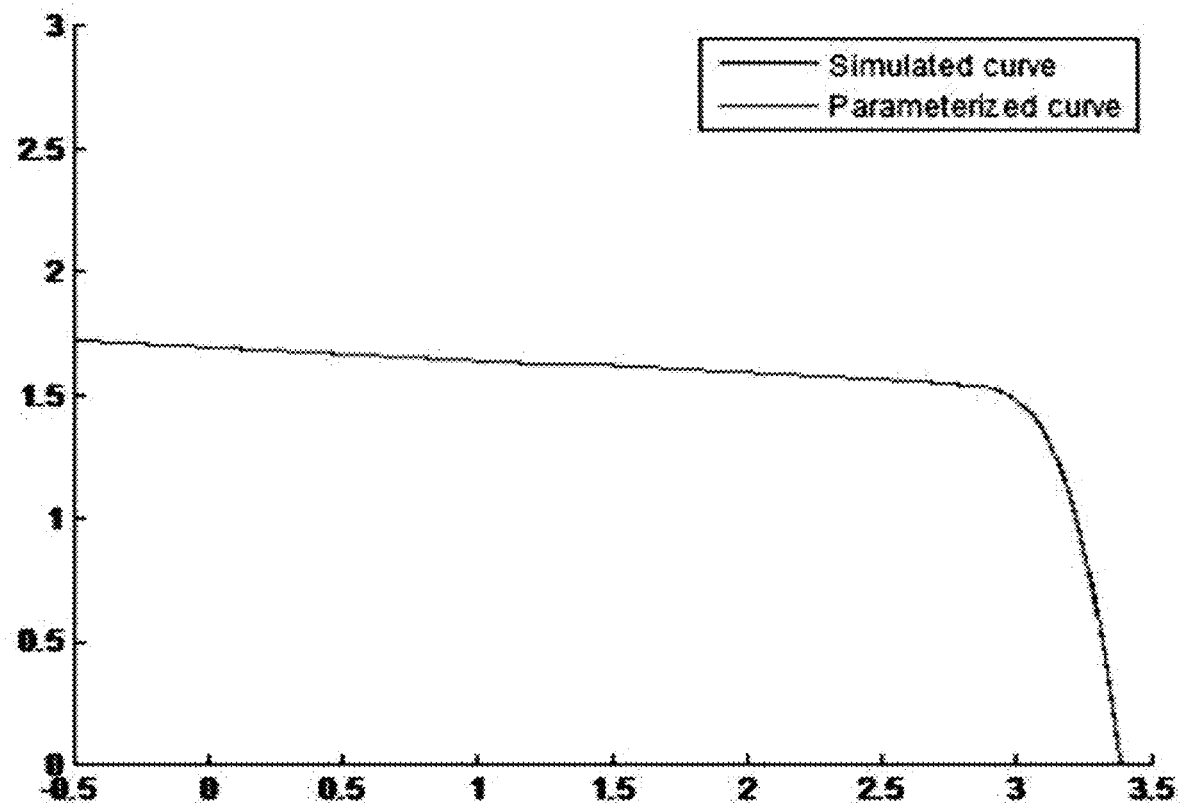
FIG. 8 shows an approach for obtaining an I-V curve for a cell-string with a non-uniform irradiation of 500 W/m$^2$ and 300 W/m$^2$ at 300K by transforming an I-V for the cell-string under non-uniform irradiation of 1000 W/m$^2$ and 800 W/m$^2$ at 300K, according to example embodiments.

Furthermore, this approach is not necessarily limited to uniform conditions. For example, when two different irradiation levels apply for different cells in the cell group, a parametrization can still be obtained when the difference between the two irradiation levels remains the same between two sets of operating conditions. For example, an error below 0.3% may still be obtainable in this situation, as shown in FIG. 8. Here, a simulated and a parameterized curve are shown for a cell-string with non-uniform irradiations of 500 W/m² and 300 W/m² at 300K. The parameterized curve is derived from a simulation of different operating conditions, in which the cell string was irradiated with 1000 W/m² and 800 W/m² at 300K.

Selecting combinations of the query parameters for which the current-voltage characteristic curve can be obtained by a transformation of a representative current-voltage characteristic curve determined for one of the selected combinations may comprise selecting a set of combinations characterized by the same, uniform irradiation and different levels of uniform temperature, e.g. Irr(i)=Irr(k) and Tc(i)=a*Tc(k), where i and k refer to different combinations of operating conditions for the cell group.

Selecting combinations of the query parameters for which the current-voltage characteristic curve can be obtained by a transformation of a representative current-voltage characteristic curve determined for one of the selected combinations may comprise selecting a set of combinations characterized by a proportionate scaling of the irradiations and temperatures, e.g. Irr(i)=a*Irr(k) and Tc(i)=a*Tc(k), where i and k refer to different combinations of operating conditions for the cell group.

For example, an approach to selecting the combinations for curve estimation by parametrization is illustrated by the pseudo-code hereinbelow:

```
For all curves in CURVES
    find curves where Irr(i)==Irr(k)
        if curves can be produced by other curve then keep only one
        curve
        else keep all
    find curves where Tc(i)==Tc(k)
        if curves can be produced by other curve then keep only one
        curve
        else keep all
    find curves where Irr(i)==a*Irr(k) & Tc(i)==a*Tc(k)
        if curves can be produced by other curve then keep only one
        curve
        else keep both
Return CURVES
```

To reduce the number of stored current-voltage characteristic curves, a method in accordance with embodiments of the second aspect of the present disclosure also comprises clustering 24 the current-voltage characteristic curves to identify at least one plurality of similar current-voltage characteristic curves. The clustering may be executed over different topologies, internal temperatures and irradiations, but may also be executed within a single topology group over different internal temperatures and irradiations.

Thus, a set of current-voltage characteristic curves which are similar to each other may be grouped together. The plurality of similar current-voltage characteristic curves may be represented by a single representative current-voltage characteristic curve, e.g. a single curve may be stored in the database as representative of the plurality of similar current-voltage characteristic curves.

The current-voltage characteristic curves being clustered may comprise current-voltage characteristic curves obtained by the simulations 25, current-voltage characteristic curves determined by parameterized transformations of other current-voltage characteristic curves, current-voltage characteristic curves obtained as rough estimates, e.g. for improbable operating conditions, and/or current-voltage characteristic curves that were pre-stored in the database.

The method may comprise clustering 24 the provided current-voltage characteristic curve, or the provided current-voltage characteristic curve and further current-voltage characteristic curves already present in the database, to identify a plurality of similar current-voltage characteristic curves. The clustering may be executed over different topologies, internal temperatures and irradiations, but may also be executed within a single topology group over different internal temperatures and irradiations.

The size of each cluster may depend on a predetermined level of accuracy. For example, such predetermined level of accuracy may be determined by comparing the use of potential cluster options and detailed simulations of the entire module. However, such accuracy level determination may not be executed for each evaluated scenario in practice, e.g. this accuracy level may be initially determined on one or a few use cases to determine a distance resolution between the stored curves to achieve a level of accuracy. The curve assigned to each cluster may be reused in a combination process, e.g. as described hereinabove, to simulate an entire module over a range of operating conditions.

The method may comprise identifying similar characteristic curves by calculating a similarity measure between each pair of current-voltage characteristic curves being considered in the step of clustering.

The similarity measure may comprise a distance metric, e.g. an n-dimensional distance, for example an aggregate distance over corresponding points between a pair of curves. Furthermore, the distance metric may be obtained by an analytic expression that expresses the distance between two parametrized functions, representing a pair of curves, as function of their parameters.

The clustering 24 may comprise applying a clustering algorithm, e.g. a k-means clustering algorithm.

Figure 9:
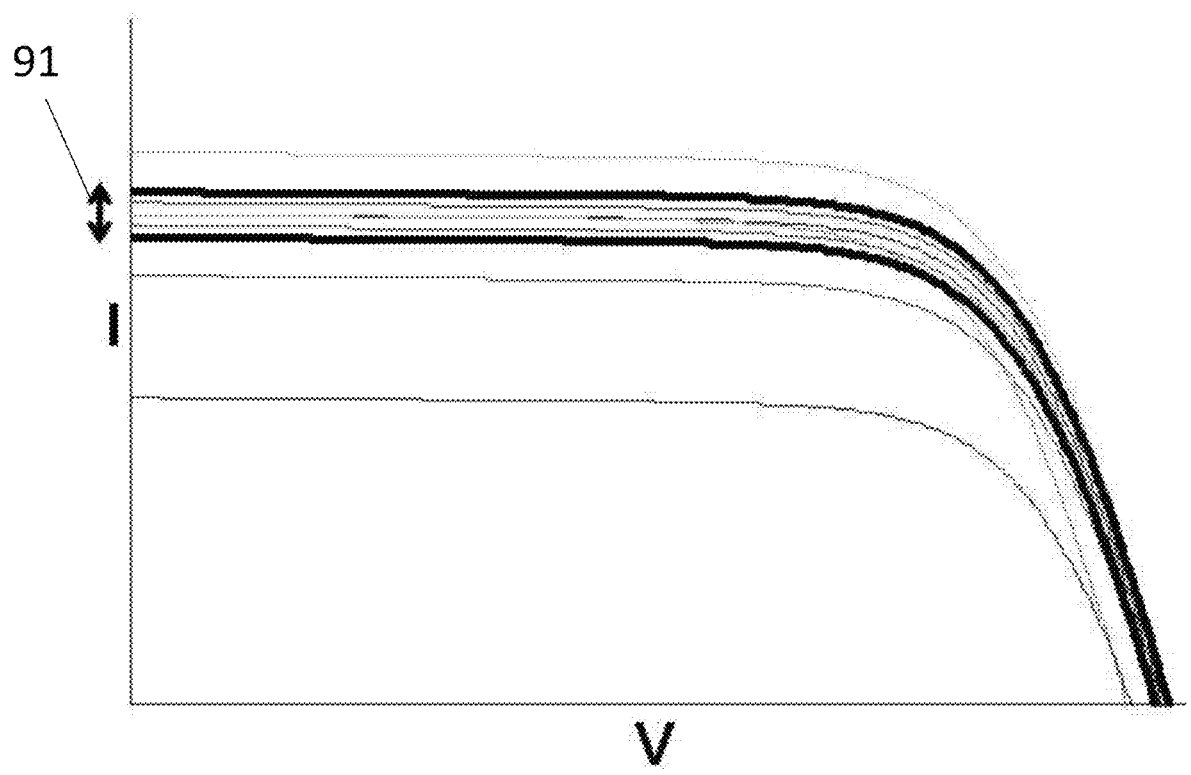
FIG. 9 illustrates a clustering approach to cluster I-V curves that are within a distance of less than a predetermined threshold from each other, according to example embodiments.

For example, a distance metric between a pair of characteristic curves, e.g. between any pair of the characteristic curves, may be calculated. FIG. 9 illustrates such clustering approach of curves within a distance of less than a threshold 91 from each other. For example, the characteristic curves may be stored as a set of points in a two-dimensional space representative of couples of current and voltage. The distance metric may be calculated over all the stored points of the pair of characteristic curves, e.g. interpolating points on either one or both of the curves where necessary, or the distance metric may be calculated in only a few predetermined points on the curves, e.g. in specific landmark feature points of the curves.

For example, a set of current-voltage characteristic curves may be determined to be similar if the distance metric between any pair of the curves in the set is less than a predetermined distance. Calculating the distance metric between a pair of the characteristic curves may take a distance, e.g. an absolute difference in voltage and/or in current, between corresponding predetermined features of the curves into account. For example, knowledge of the shape of the characteristic curves can be taken into account by such features, e.g. a strong linearity can be expected and/or assumed near the short circuit current.

Also, a relevance of a point for selecting an operating point on the curve can be taken into account by such features, e.g. a feature may be close to the maximum power point of the curve. For example, the predetermined features may comprise at least one point near the short circuit current and near the open circuit voltage. For example, curves may be grouped together when the distance in points which are likely selected as operating points are below a predetermined threshold.

The distance metric may be a maximum distance over distance evaluations of corresponding points in the pair of curves, or may be another summary measure, such as a median or average.

The distance metric may be a maximum difference in current or voltage, e.g. in one dimension, or it may be a two-dimensional distance metric based on, for example, an area between the pair of curves, e.g. a difference of the area under the curve for the pair of curves respectively. Alternatively, the distance metric may be calculated by a comparison, e.g. a difference, of a quantity determined by a predetermined functional relation as function of the current and voltage.

When curves are compared that were obtained by simulating cell-strings under uniform irradiation and temperature conditions, the characteristic curves for cell-strings operating under the same temperature and slightly different irradiation levels, have predominantly shown small differences in the low voltage range, while the characteristic curves for cell-strings operating under the same irradiation level but slightly different temperatures show predominantly differences around the knee of the curves.

Since in a method in accordance with embodiments of the first aspect of the present disclosure the characteristic curves may be retrieved to be combined, as described hereinabove, e.g. pairwise by serial or parallel connections, the clustering approach, e.g. the distance metric and cluster threshold, may be adapted for the intended use of the data in the database. For example, cell groups may be connected in series when their respective operating conditions are similar, e.g. under substantially uniform irradiation and temperatures over the cell groups, while cell groups may be connected in parallel when their respective operating conditions are dissimilar. This may restrict the range of potential operating points of each cell group, e.g. such that clustering may be focused on a smaller voltage range of the current-voltage characteristic curves. Furthermore, clustering may also be applied for more than one distance metric, e.g. such that clusters are provided based on, for example, a similarity in a low voltage range of the curves, as well as clusters based on, for example, a similarity in a high voltage range of the curves. A query request may, in such embodiments, comprise an indicator to select which clustering criteria are considered more relevant for the application, e.g. for the module configuration for which the curve of a cell group is retrieved.

Furthermore, a predetermined threshold for the distance metric, used in the clustering 24 process, may be a uniform threshold, e.g. applied to create curves over all operating conditions, but may also be an adaptive threshold. For example, the density of the clusters may be increased in regions of the operating condition space (e.g. in regions of the joint space formed by the internal temperature(s) and the irradiation(s) for cells of a cell group having a cell group topology) where a higher utility can be expected, e.g. where conditions correspond to common ranges for use in practical scenarios. For example, the density of the clusters may be increased, e.g. which increases the accuracy, by decreasing the distance threshold, e.g. thus creating more clusters, on average, in the region of increased density.

The step of clustering 24 may be carried out in accordance with the following pseudo-code:

```
For all curves, calculate distance between curves
apply clustering algorithm (e.g. kmeans,...)
    in which a distance threshold depends on accuracy level
    if curve is frequent, then assign a larger weight
for each cluster
    assign one representative curve to each cluster
```

Curves which cannot be clustered, e.g. because they are isolated by a distance that is too large from other curves, and/or which correspond to a combination of operating conditions that can be expected occur only infrequently, may be referred to a backup scenario.

The dissimilar current-voltage characteristic curves may be mapped onto one or more backup scenarios, e.g. one or more representative current-voltage characteristic curves. For example, a first set of query requests corresponding to a plurality of dissimilar current-voltage characteristic curves may be mapping onto a first backup scenario, a second set of query requests corresponding to another plurality of dissimilar current-voltage characteristic curves may be mapped onto a second backup scenario, etc. Additionally or alternatively, different backup scenarios may be provided for the same plurality of dissimilar current-voltage characteristic curves, e.g. such that, in use of the database, a backup scenario can be selected as a function of an objective.

For example, one or more of the backup scenarios may provide a rough under- or over-estimation of one or more quantities of interest, e.g. an under-estimation of the power produced by the photovoltaic cell group.

In such a backup scenario, current-voltage characteristic curves may be grouped together that are substantially dissimilar. Therefore, the errors associated with such a backup scenario may, potentially, be very large. However, the curves associated with such backup scenario may also be considered as corresponding to rare and/or unlikely conditions, such that the impact of such error on the accuracy of an overall objective measure, such as an energy-yield, may still be within tolerance limits.

For example, for such backup scenario, a conservative under-estimate of the curve may be provided for the query requests that are attributed to this backup scenario. For example, a backup scenario may merely correspond to the under-estimate that the cell group will not produce any power. However, more accurate and yet still conservative under-estimates may be determined by other methods as well.

Thus, in a method in accordance with example embodiments, the clustering of the current-voltage characteristic curves may also comprise identifying a plurality of current-voltage characteristic curves that are dissimilar with respect to any of the curves of the at least one plurality of similar current-voltage characteristic curves, e.g. identifying a plurality of outlier current-voltage characteristic curves. The method may comprise generating a many-to-one mapping in the database to map query requests that correspond to each of the plurality of dissimilar current-voltage characteristic curves onto one or more backup scenarios, e.g. representative current-voltage characteristic curves, for providing a rough under-estimation of the power produced by the photovoltaic cell group, e.g. under the indexed operating conditions that map onto the isolated and/or outlying I-V characteristic curves.

The method also comprises generating 26 a many-to-one mapping in the database to map query requests that correspond to each of the at least one plurality of similar current-voltage characteristic curves onto a single representative current-voltage characteristic curve for that plurality of similar current-voltage characteristic curves, each query request identifying a topology of a photovoltaic cell group, at least one internal temperature for the photovoltaic cells in the photovoltaic cell group and at least one cell irradiation for the photovoltaic cells in the photovoltaic cell group. For example, a mapping may be generated in the database to map a topology of a photovoltaic cell group, a plurality of internal temperatures of each photovoltaic cell in the photovoltaic cell group and a cell irradiation of each photovoltaic cell in the photovoltaic cell group corresponding to the plurality of similar current-voltage characteristic curves onto a single representative current-voltage characteristic curve.

The method may also comprise determining a representation of a subset of query parameters, e.g. relating to topology, internal temperatures and/or irradiations, to summarize a plurality of keys mapping onto the same current-voltage characteristic curve in a succinct manner, for example by defining a range or combination of ranges in the query domain or a parametrization of a subset of the query domain.

The method may comprise storing a current-voltage characteristic curve in the database in the form of a lookup table, e.g. a list of current and voltage pairs, and/or in the form of parameters of a parametrized function, e.g. curve fitting parameters of a curve model fitted to the current-voltage pairs generated by the simulation. Alternatively, the simulation may generate the curve-voltage characteristic curve directly in the form of such parameters of a parametrized function.

When a large number of different operating conditions of a single photovoltaic module may be examined, e.g. in which a plurality of shading patterns create different operating conditions, simulation of all possible scenarios on the module level, e.g. by a fully integrated model, may take a large amount of time. Furthermore, clustering of equivalent operating scenarios, e.g. shading patterns, and limiting the simulations on the module level could be difficult to achieve. However, in accordance with example embodiments, the module-level simulations may be broken down to simpler simulations of groups of photovoltaic cells, e.g. cell-strings. Therefore, the different operating scenarios at each cell group level are less numerous due to the smaller number of cells. By combining pre-simulated operating scenarios of the cell groups, module-level scenarios can be simulated efficiently.

Some embodiments may also comprise a step of determining the photovoltaic cell groups based on one or more photovoltaic system configurations, e.g. for determining atoms of functionality for constructing one or more diagrams representative of the photovoltaic system configuration(s). For example, the step of determining the photovoltaic cell groups may comprise partitioning the photovoltaic system configuration(s) into the photovoltaic cell groups.

Figure 19:
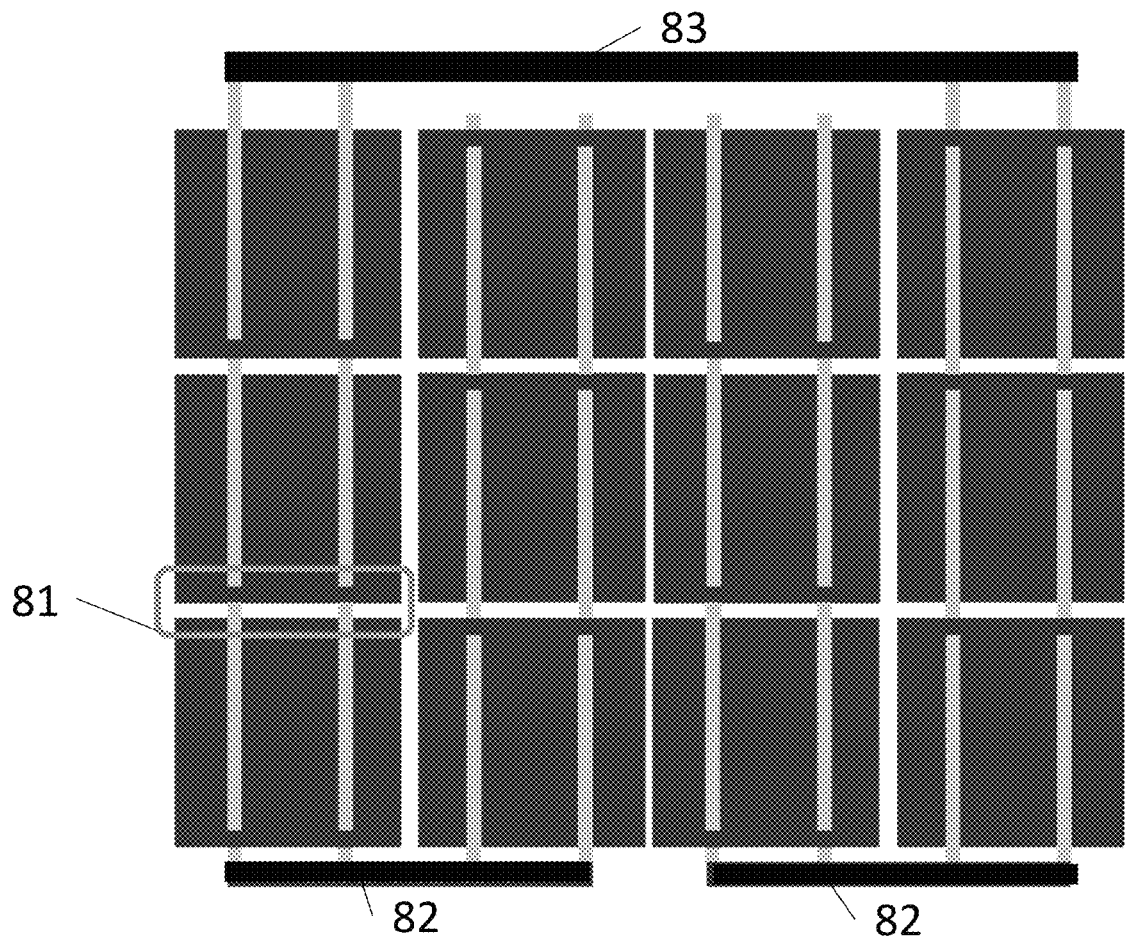
FIG. 19 shows a photovoltaic module comprising cells with two bus-bars, in which photovoltaic cells can be connected with different configurations, according to example embodiments.

In some embodiments, cells can be connected in different configurations, e.g. by straight cell-to-cell connections 81, by short stringing 82 or by long stringing 83, as illustrated in FIG. 19 for cells with two bus-bars.

The type of electrical connection between two cells may affect the thermal dependency between the cells. For example, four different classes can be considered for thermal connections:

1. Strong (S)—e.g. as typically observed for straight cell-to-cell connection
2. Medium-Strong (MS)—e.g. as typical for short-stringing
3. Medium-Weak (MW)—e.g. as typical for long-stringing
4. Weak (W)—e.g. representative for non-interconnected cells Furthermore, when a switch is present along an electrical connection, this may reduce the thermal dependency between the interconnected cells. For example, when a switch is implemented within the electrical interconnection between two cells, the thermal classification of such interconnection may move one step down, e.g. from S to MS or from MW to W.

For example, using such an approach, the thermal connections may be ranked as follows:

Straight cell-to-cell interconnection without a switch: Class S

Straight cell-to-cell interconnection with a switch: Class MS

Cells interconnected via short-stringing without a switch: Class MS

Cells interconnected via short-stringing with a switch: Class MW

Cells interconnected via long-stringing without a switch: Class MW

Cells interconnected via long-stringing with a switch: Class W

Cells that are not interconnected: Class W

By ignoring thermal dependencies, accuracy may decrease. However, such accuracy loss may be dependent on the strength of any given thermal connection that is ignored. For example, if a thermal interconnection is weaker, the impact in terms of a lowered accuracy may also be less pronounced by ignoring the thermal link.

Thus, determining the photovoltaic cell groups may comprise selecting thermal connections to be ignored, e.g. in an approximation. This selection may take the thermal classification of interconnections, e.g. as defined hereinabove, into account.

Determining the photovoltaic cell groups may also comprise an analysis of the impact of ignoring thermal connections of a predetermined thermal class, e.g. repeated for a plurality of such thermal classes. The cell groups may thus be formed by disconnecting cell clusters that were only thermally connected by the ignored thermal connections, e.g. that were generally "weakly" thermally coupled, to adjacent cells, e.g. to adjacent clusters.

For example, first, all thermal interconnections belonging to "Class W" may be removed and the simulation results thus obtained may be compared with a reference simulation. If an accuracy loss is below a predetermined threshold, e.g. is negligible, in a second step, thermal interconnections belonging to "Class MW" may be removed additionally. Again, simulation results are compared with the reference. Such procedure may be repeated until a class is found for which accuracy loss is above the predetermined threshold, e.g. is not negligible or can be considered unacceptable given operational objectives. For example, the predetermined threshold may correspond to an accuracy loss of 0.5%. Furthermore, more and/or other thermal classes may be used in a similar approach and/or more and/or other ranking rules may be used, e.g. relating to the position of the interconnection within the module, such as along the module's edges or at the center of the module. Decisions regarding such methodological parameters may depend on a trade-off between accuracy and computation complexity.

In a third aspect, the present disclosure also relates to a computer program product for performing a method in accordance with embodiments of the first and/or second aspect of the present disclosure. The computer program product is not necessarily limited to a computer program product suitable for execution on a general purpose computer, such as a personal computer device or a computing cluster, but may also comprise a computer program product suitable for execution or implementation in a specific processing platform. For example, such specific processing platform may comprise a secondary processing device in a computer system for enhanced parallel and/or vector-oriented numeric processing, e.g. a graphics processing unit (GPU) and/or a cell broadband engine architecture (CBEA) device. The specific processing platform may also comprise an integrated processing device, such as a microcontroller and/or a field-programmable gate array (FPGA).

In a fourth aspect, the present disclosure also relates to a computer readable storage medium, and/or a transmission over a digital communication network, in which the storage medium and/or the transmission comprises a computer program according to embodiments of the third aspect of the present disclosure.

In a fifth aspect, the present disclosure also relates to a photovoltaic system simulation system comprising a processor adapted for carrying out a method in accordance with embodiments of the first and/or second aspect of the present disclosure. The processor may comprise an application specific integrated circuit (ASIC) device, a general purpose processor, e.g. a central processing unit (CPU), a microcontroller, a field-programmable gate array device (FPGA) and/or a similar device that is suitable for implementing the method by a designed, programmable and/or configurable logic behavior.

The photovoltaic system simulation system may be adapted for estimating a performance measure and/or an operating parameter of a photovoltaic system configuration at run-time, e.g. such that a setting of a knob of a reconfigurable photovoltaic system can be adjusted, e.g. optimized, in (substantially) real-time. For example, at a moment in time at which energy is consumed, channeled to a storage system, such as a battery, or retrieved from such storage system, the setting may be adjusted to optimize the reconfigurable system configuration.

Thus, example embodiments also relate to a reconfigurable photovoltaic system comprising a photovoltaic system simulation system, in accordance with example embodiments, for estimating a performance measure and/or an operating parameter of the reconfigurable photovoltaic system for one or more run-time configurations thereof.

Figure 10:
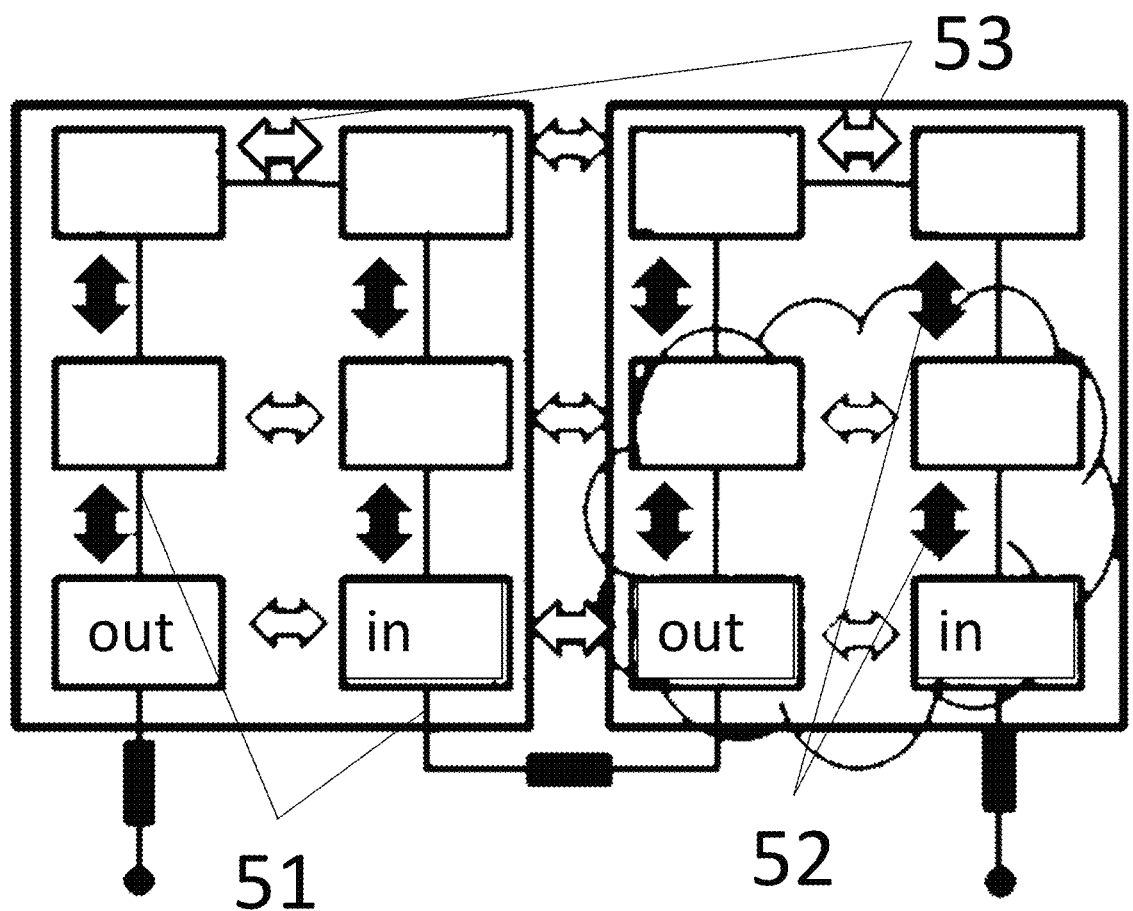
FIG. 10 shows thermal connections and electrical connections between the cells of two adjacent cell-strings, according to example embodiments.

For example, a module having a snake-type cell-string topology is considered. In simulations over different run-time configurations and different operating conditions of this configuration, the cell strings may be considered as common components. Thermal connections 52, 53 and electrical connections 51 between the cells, for two cell-strings in accordance with this example, are illustrated in FIG. 10. For this configuration, it can be assumed that strong thermal dependencies 52 exist between cells that are electrically interconnected in the module, i.e. within a cell string. The thermal interconnections 53 of the cell strings that are on the periphery of the module can be considered to be weakly coupled.

In some embodiments, the simulation process of the module under its various operating and configurable conditions can be simplified by combining selected I-V curves and determining the I-V curves at the inputs of the conversion units. By reducing the photo-electro-thermal simulation model to simulations of individual cell strings, thermal dependencies between cell strings can be ignored at this level of the simulation. Since these thermal dependencies, in the configuration, may be relatively weak, this may be considered as an approximation. Therefore, simulation time can be significantly decreased compared to a full model simulation of the module over the large space of operating conditions and configurations. For example, the simpler models of the individual cell strings can be simulated much faster and may even be simulated in parallel.

Figure 11:
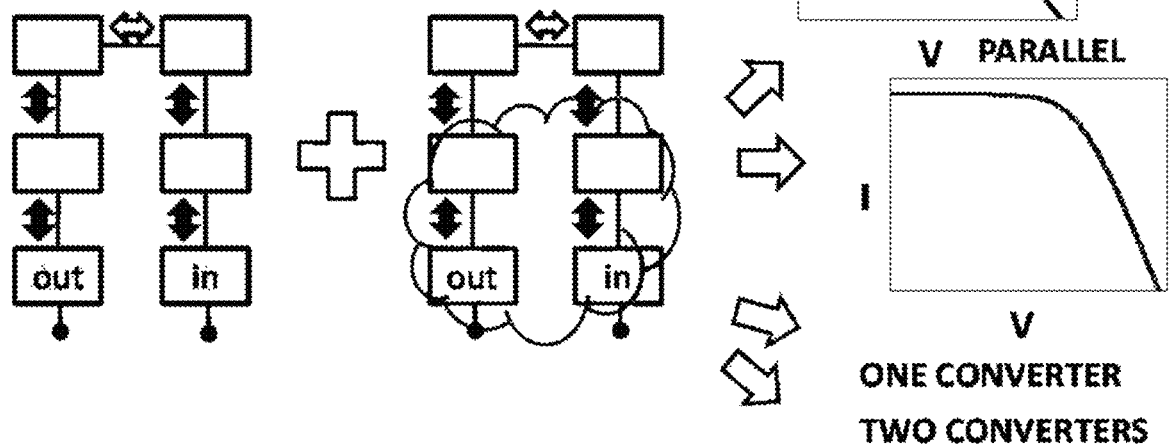
FIG. 11 illustrates how I-V characteristic curves can be combined in various ways, according to example embodiments.

Some embodiments may include a same number of cells in at least a majority of the cell strings, e.g. to allow an efficient parallel connection of the cell strings. Therefore, some embodiments may include cell string layouts in which the majority of the cell strings are similar. In the case of the present example of a snake-type cell-string layout, this could, for example, imply that all cell strings of the U-shape type and most of the cell strings of the I-shape type are, respectively, substantially the same. Therefore, most cell strings may not be re-simulated for the same operating conditions. The individual I-V curves, obtained by the cell-string level simulations, can be connected in various ways, e.g. in accordance with the re-configurability of the module, such that the result of the simulated I-V curves may be reused in multiple simulations of run-time instances of the reconfigurable module, e.g. as schematically illustrated in FIG. 11. Particularly, a single simulated I-V curve may be reusable for multiple run-time instances as well as for a plurality of cell strings having the same number of cells and the same configuration within each run-time instance.

Some embodiments may implement various simplifications, optimizations and/or approximate approaches, such as neglecting thermal connections between photovoltaic cell groups, as an approximation, adding resistances to model series, parallel and/or hybrid connections between the photovoltaic cell groups, calculating combinations of current-voltage characteristic curves, a prediction of internal photovoltaic cell temperatures to select I-V characteristic curves, and/or a clustering of similar I-V characteristic curves, e.g. as representative of system scenarios. An evaluation of the combined error of all points in the aggregate I-V characteristic curve, under uniform and non-uniform conditions, due to neglecting thermal coupling between cell groups, adding the resistances and combining the I-V curves, was observed to be below 0.1%. The approach in accordance with embodiments may achieve an error below 0.5% in power for a time resolution of 1 s, relative to a state-of-the-art simulation environment. Furthermore, such target accuracy may be achievable by tuning a distance function and/or clustering threshold in a clustering step in a method in accordance with example embodiments.

Figure 12:
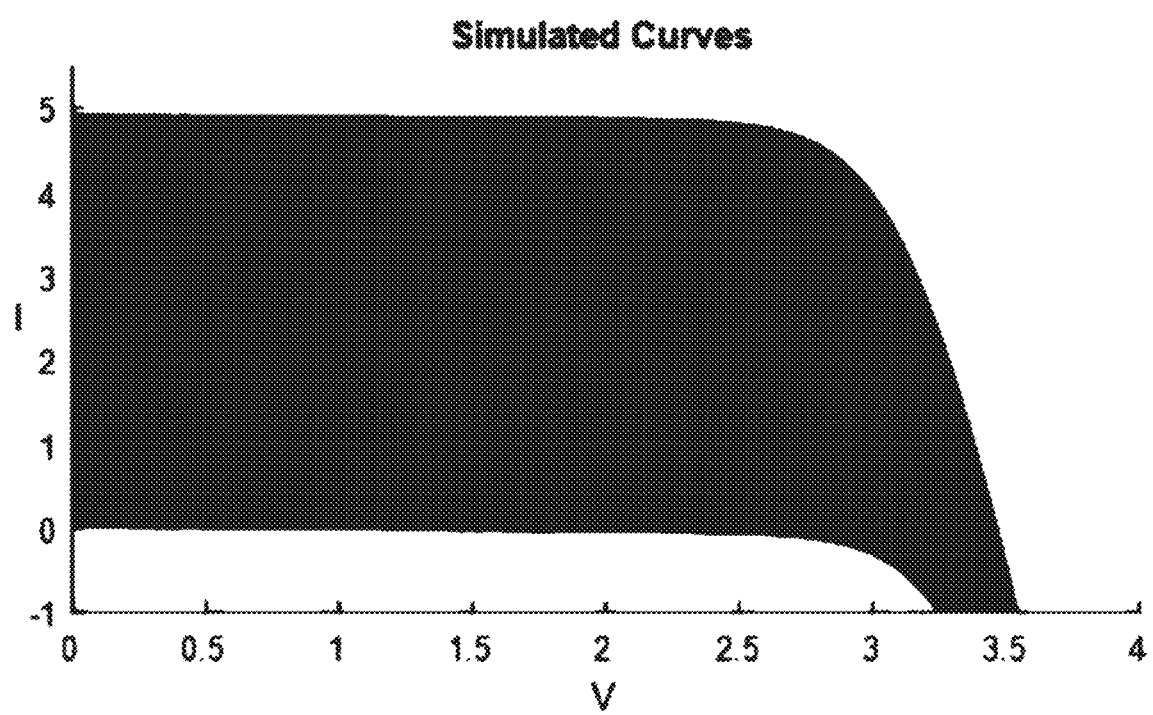
FIG. 12 shows 1000 I-V characteristic curves obtained in which a photovoltaic cell-string was simulated for 1000 levels of (uniform) irradiation and one level of internal temperature, according to example embodiments.

In an illustrative example, a day of uniform irradiation was simulated. Furthermore, cell-strings are used as cell groups, as described hereinabove. A constant internal temperature was assumed for the cells, which was set to the average internal temperature throughout that day. A single cell-string was simulated for 1000 levels of irradiation and one level of internal temperature, thus resulting in 1000 I-V characteristic curves. These curves are illustrated n FIG. 12.

The simulation of the uniform day with series connection of the cell-strings, approximately, 200 s in the simulation framework in accordance with example embodiments. This is, approximatively, an improvement of a factor 165 relative to a prior-art detailed simulation model. The daily error in energy estimation was 1.5% and the average error in power per second was about 5%. For the period of the day where the power was over 20 W, corresponding to an irradiation of over 150 W/m$^2$, the average error in power per second was about 4%. These errors were calculated with respect to a simulation outcome of a prior-art model used as gold standard.

Figure 13:
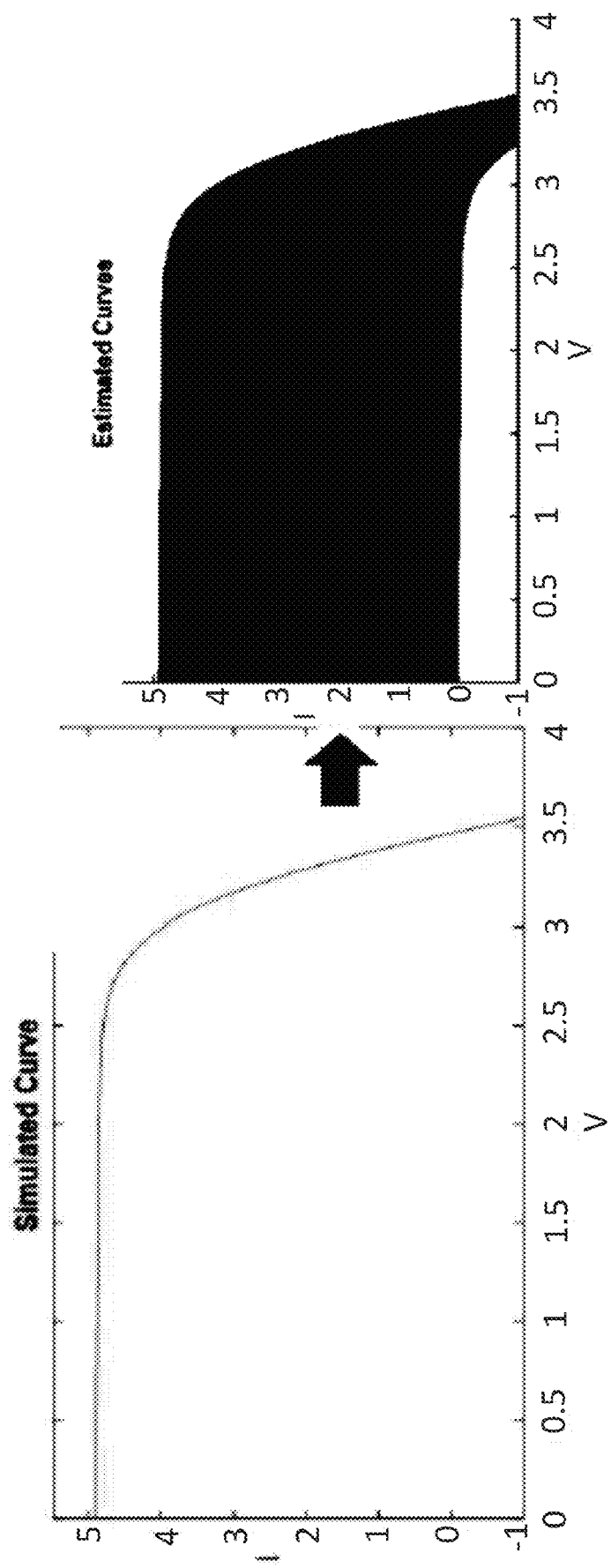
FIG. 13 illustrates a parametrization approach to determine a plurality of I-V curves from a single I-V curve obtained by simulation, according to example embodiments.

Next, instead of simulating and storing all I-V curves, only one curve was simulated in detail and stored in the database, while the others were derived from that curve based on the parameterization approach discussed hereinabove. This is schematically illustrated in FIG. 13.

The daily error remained at 1.5%, while the average error in power per second rises to 6%, e.g. due to errors in the low irradiation levels. For the period of the day where the power production is over 20 W, the average error in power remains at about 4%.

Figure 14:
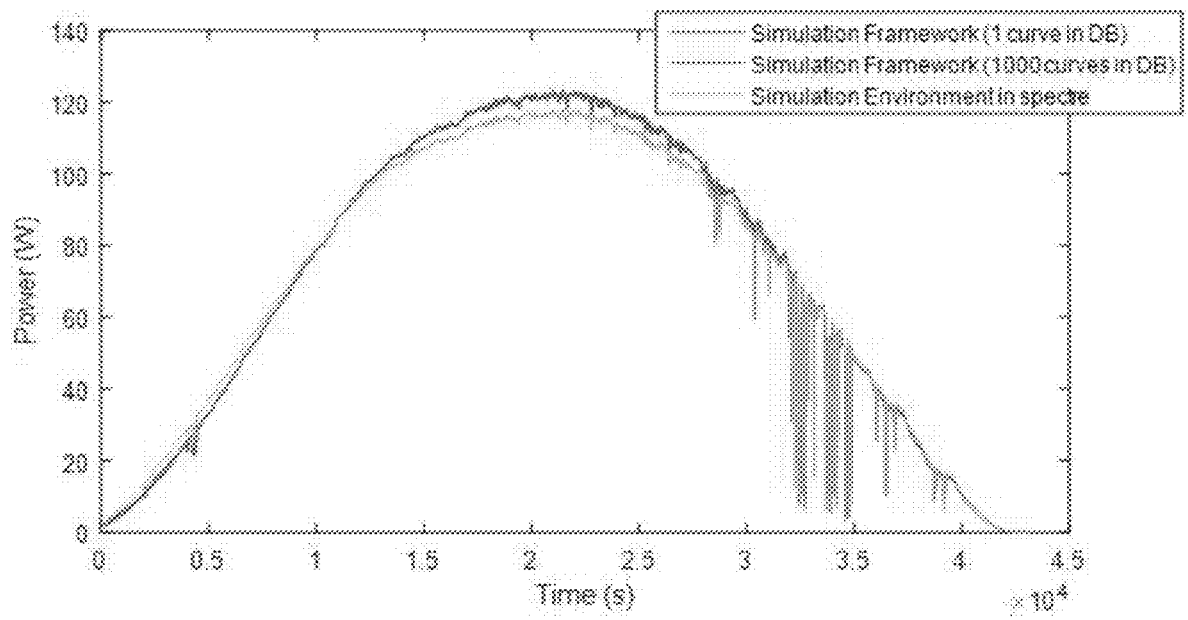
FIG. 14 shows a comparison of simulation results for a simulation based on 1000 separately simulated I-V curves for 1000 curves extrapolated from a single detailed simulation of an I-V curve and for an alternative state-of-the-art method, according to example embodiments.

FIG. 14 shows a comparison of the simulation results for the simulation based on 1000 separately simulated I-V curves, for 1000 curves extrapolated from a single detailed simulation of an I-V curve, and for an alternative state-of-the-art method as reference. The graphs of the simulated power for the approach in which all curves are separately simulated and for the approach in which the curves are estimated from a single detailed simulation substantially coincide, e.g. may be substantially indistinguishable.

Using only one internal temperature level for the entire day may cause significant errors. However, some embodiments may provide an approach to predicting the internal temperatures, e.g. changes of the internal temperatures throughout the day. However, the estimation of I-V curves from a single reference curve, e.g. under predetermined relations between the operating conditions, does not appear to increase the error significantly and may severely limit the number of detailed low-level simulations of the cell groups.

Figure 15:
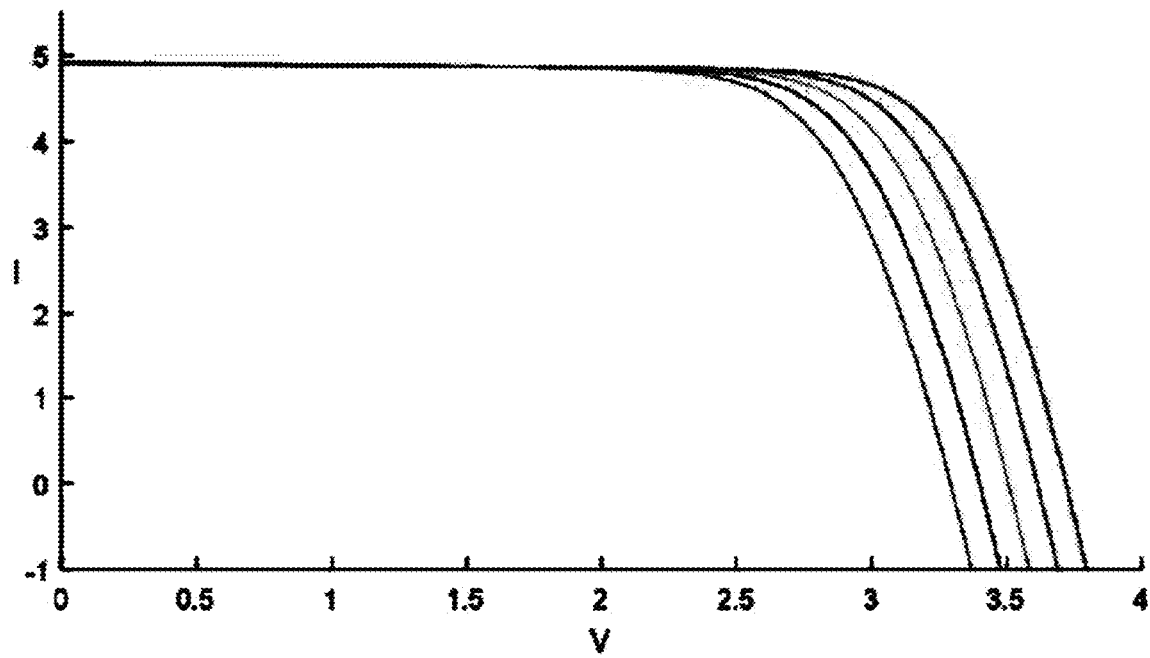
FIG. 15 illustrates I-V characteristic curves obtained, in which a photovoltaic cell-string was simulated for five different (uniform) internal temperature levels, according to example embodiments.
Figure 16:
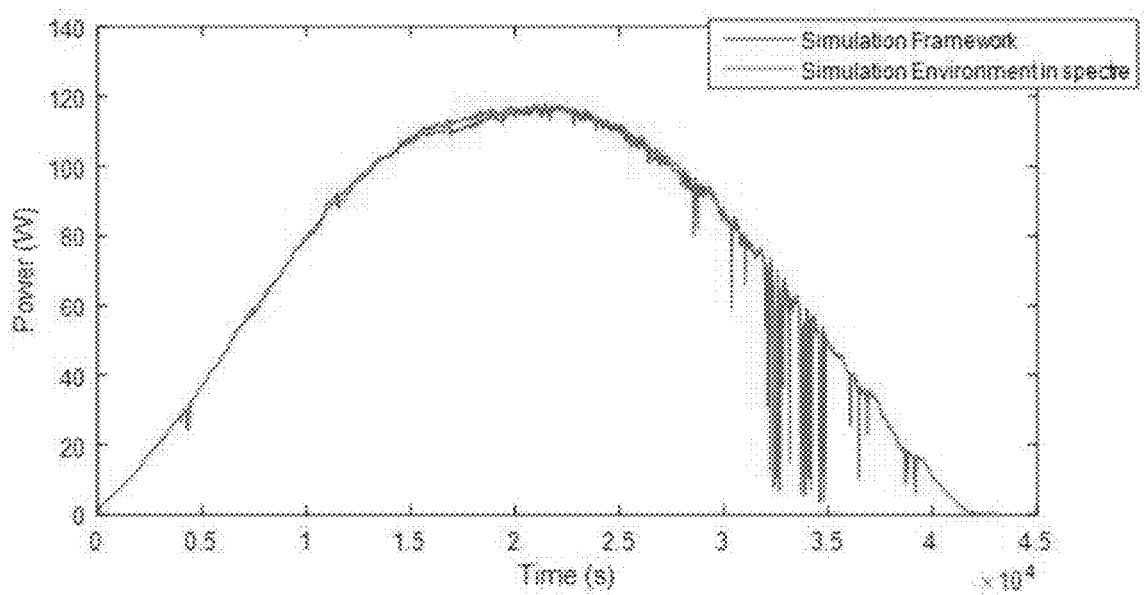
FIG. 16 shows a comparison of simulation results for a simulation and for an alternative state-of-the-art method, according to example embodiments.

In a next example, the simulation was performed for five different temperature levels. By using an internal temperature prediction approach in accordance with example embodiments to select between the five different temperature levels, e.g. illustrated by the I-V curves in FIG. 15, the daily error was reduced to 0.4%. The average error per second was reduced to 2.5%, while for the part of the day where the power is over 20 W the average error was 1.1%. The two power curves from the simulation framework in accordance with example embodiments and the reference prior-art approach are shown in FIG. 16.

Figure 17:
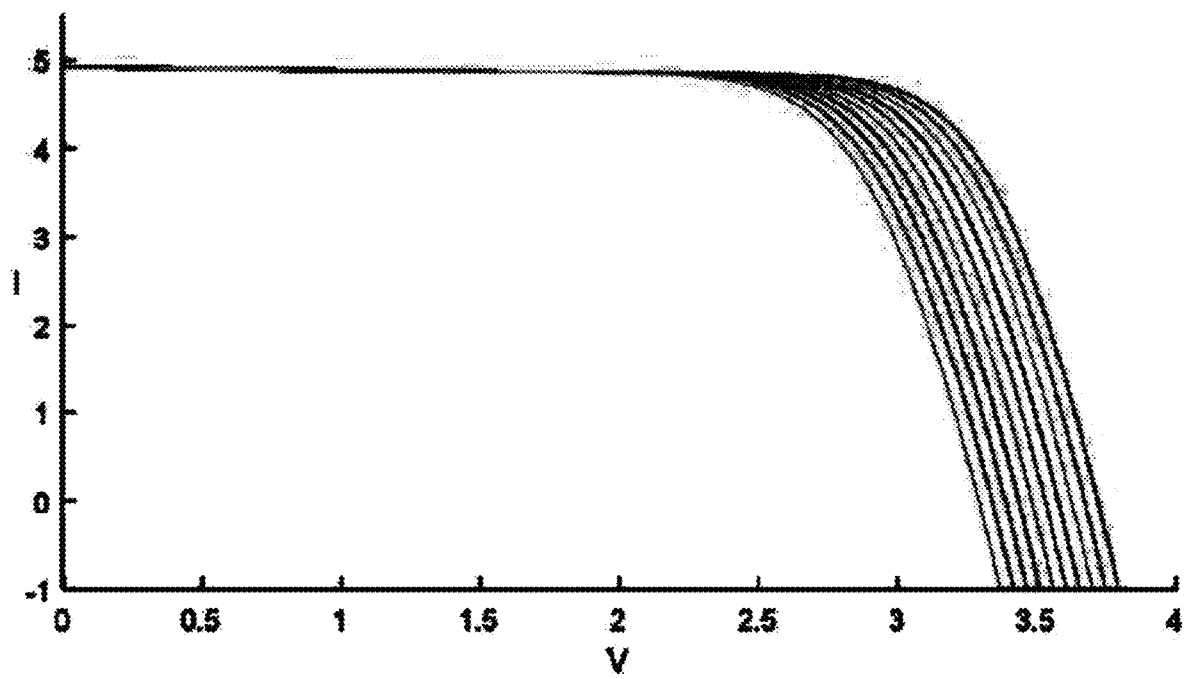
FIG. 17 illustrates I-V characteristic curves obtained in which a photovoltaic cell-string was simulated for ten different (uniform) internal temperature levels, according to example embodiments.
Figure 18:
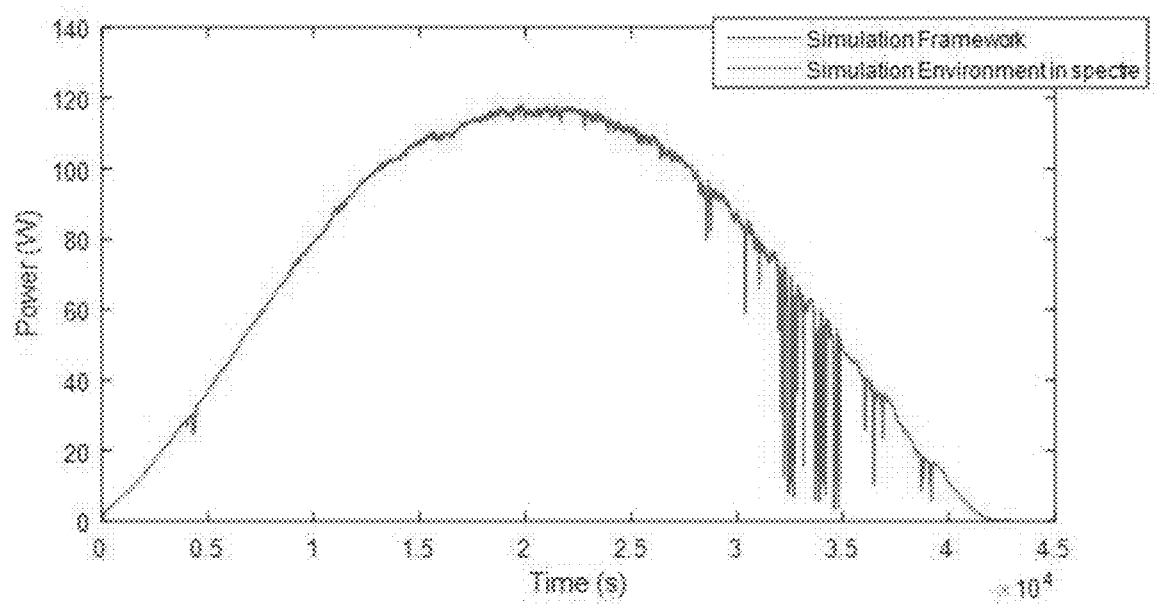
FIG. 18 shows a comparison of simulation results for a simulation and for an alternative state-of-the-art method, according to example embodiments.

By increasing the number of temperature levels to 10, e.g. providing the 10 I-V curves shown in FIG. 17, the accuracy level of the simulation framework in accordance with example embodiments was further improved. The simulated power of the simulation framework in accordance with example embodiments and the reference prior-art approach are shown in FIG. 18. The daily error was found to be negligible, i.e. about 0.02%, while the average error in power per second was 1.8%. For the period of the day where the power is over 20 W, the average error in power is 0.6%.

The accuracy and the speed which can be achieved by the example embodiments, e.g. as shown by this example in which only 10 I-V curves are simulated in detail, shows that this approach can provide an overall simulation time and can allow an investigation of more design topologies of a photovoltaic module in a reasonable time.

Furthermore, in order to improve the accuracy at low irradiation levels, which could be relevant for scenarios involving partially shaded modules, while also maintaining a high accuracy for high irradiation levels, instead of inferring the I-V curves from a single simulated I-V curve at a high irradiation level, two (or more) sets of detailed simulations could be used, e.g. for high and low irradiation levels.

What is claimed is:

1. A computer-implemented method for generating or updating a database comprising a plurality of current-voltage characteristic curves, comprising:
   simulating, for an at least one combination of a topology of a photovoltaic cell group, at least one internal temperature for the photovoltaic cells in the photovoltaic cell group and at least one cell irradiation for the photovoltaic cells in the photovoltaic cell group, a model of the photovoltaic cell group to provide a current-voltage characteristic curve representative of the at least one combination;
   clustering the current-voltage characteristic curves to identify at least one plurality of similar current-voltage characteristic curves; and
   generating a many-to-one mapping in the database to map query requests that correspond to each of the at least one plurality of similar current-voltage characteristic curves onto a single representative current-voltage characteristic curve for that plurality of similar current-voltage characteristic curves, each query request identifying a topology of a photovoltaic cell group, at least one internal temperature for the photovoltaic cells in the photovoltaic cell group and at least one cell irradiation for the photovoltaic cells in the photovoltaic cell group, wherein identifying the similar current-voltage characteristic curves comprises calculating a distance metric between each pair of current-voltage characteristic curves, the distance metric being a maximum difference in current, being a maximum difference in voltage, being a difference between each area under the curve for the pair of current-voltage characteristic curves or being based on a comparison of a predetermined quantity that is determined by a functional relationship from the voltage and current defined by the pair of current-voltage characteristic curves.

2. The method of claim 1, wherein the clustering of the current-voltage characteristic curves further comprises identifying a plurality of current-voltage characteristic curves that are dissimilar with respect to any of the curves of the at least one plurality of similar current-voltage characteristic curves, and generating a many-to-one mapping in the database to map query requests that correspond to each of the plurality of dissimilar current-voltage characteristic curves onto one or more backup scenarios.

3. The method of claim 1, further comprising determining a compact representation of a current-voltage characteristic curve, wherein the determining of the compact representation comprises:
   determining at least one curve segment of the current-voltage characteristic curve that is substantially linear and representing the curve segment in the compact representation by a current value and a voltage value for each of both endpoints of the curve segment; and
   adding current values and voltage values corresponding to a frequent operating point, an open circuit voltage or a short-circuit current to the compact representation.

4. The method of claim 1, further comprising:
   generating a plurality of combinations by an exhaustive enumeration of, or sampling from, a parameter space defined by at least one internal temperature for the photovoltaic cells in the photovoltaic cell group and at least one cell irradiation for the photovoltaic cells in the photovoltaic cell group; and
   selecting the at least one combination simulating from the generated plurality of combinations by eliminating improbable combinations, infeasible combinations or redundant combinations from the plurality of combinations, and, for combinations of the generated plurality of combinations that were eliminated for being improbable, providing a rough estimate of the current-voltage characteristic curve instead of simulating the current-voltage characteristic curve using the model.

5. The method of claim 4, wherein selecting the at least one combination from the plurality of generated combinations comprises:
   eliminating combinations, from the plurality of generated combinations, wherein the current-voltage characteristic curve can be represented by a parameterized transformation of another current-voltage characteristic curve corresponding to another of the plurality generated combinations; and
   determining the current-voltage characteristic curve for the eliminated combinations by the parameterized transformation.

6. A computer-implemented method for estimating at least one performance measure or operating parameter of a photovoltaic system configuration under a sequence of temporally evolving operating conditions, the photovoltaic system configuration comprising a configuration of a plurality of statically switchable serial interconnections, statically switchable parallel interconnections, dynamically switchable parallel interconnections or dynamically switchable serial interconnections between photovoltaic cell groups, the method comprising:
   obtaining a database comprising a plurality of current-voltage characteristic curves, each current-voltage characteristic curve being accessible by a query request identifying a topology of a photovoltaic cell group, at least one internal temperature for the photovoltaic cells in the photovoltaic cell group and at least one cell irradiation for the photovoltaic cells in the photovoltaic cell group, wherein the database provides a mapping of the query request onto the plurality of current-voltage characteristic curves in a form of a many-to-one mapping, wherein the mapping maps a cluster of different topologies, the mapping maps different internal temperatures or the mapping maps different cell irradiations onto a single representative current-voltage characteristic curve;
   receiving data indicative of the sequence of operating conditions as input, the data comprising at least an irradiation, an ambient temperature and a wind velocity for each step of the sequence;
   determining, for at least one photovoltaic cell in each of the photovoltaic cell groups, a sequence of internal temperatures corresponding to the sequence of operating conditions, taking at least the irradiation, the ambient temperature and the wind velocity into account;
   selecting, for each of the photovoltaic cell groups, a representative current-voltage curve from the database by a query request based on a topology of the photovoltaic cell group, the irradiation and the internal temperatures determined for each photovoltaic cell of the photovoltaic cell group;
   calculating at least one aggregate current-voltage characteristic curve for each step of the sequence of evolving operating conditions; and
   outputting at least one performance or operating parameter for each step of the sequence of evolving operating conditions,
   wherein obtaining the database comprises:
   simulating, for an at least one combination of a topology of a photovoltaic cell group, at least one internal temperature for the photovoltaic cells in the photovoltaic cell group and at least one cell irradiation for the photovoltaic cells in the photovoltaic cell group, a model of the photovoltaic cell group to provide a current-voltage characteristic curve representative of the at least one combination;

clustering the current-voltage characteristic curves to identify at least one plurality of similar current-voltage characteristic curves; and generating a many-to-one mapping in the database to map query requests that correspond to each of the at least one plurality of similar current-voltage characteristic curves onto a single representative current-voltage characteristic curve for that plurality of similar current-voltage characteristic curves, each query request identifying a topology of a photovoltaic cell group, at least one internal temperature for the photovoltaic cells in the photovoltaic cell group and at least one cell irradiation for the photovoltaic cells in the photovoltaic cell group.

7. The method of claim 6, wherein determining of the sequence of internal temperatures comprises calculating at least one internal temperature for the photovoltaic cells in each of the photovoltaic cell groups and for each time step of the sequence of operating conditions by evaluating a state equation of an Nth order thermal model that takes into account the ambient temperature for that time step, the irradiation for that time step, the ambient temperatures corresponding to the N−1 preceding time steps, the irradiations corresponding to the N−1 preceding time steps and the at least one internal temperature that were determined for the photovoltaic cell group for the N−1 preceding time steps.

8. The method of claim 6, further comprising: selecting an operating point of the at least one aggregate current-voltage characteristic curve for each time step of the sequence of operating conditions, taking a predetermined objective into account.

9. The method of claim 8, wherein operating point selected for a time step of the sequence of temporally evolving operating conditions is taken into account in determining the internal temperatures for a next time step of the sequence of temporally evolving operating conditions.

10. The method of claim 6, wherein calculating the at least one aggregate current-voltage characteristic curve comprises transforming and combining at least one pair of the selected current-voltage characteristic curves by taking a serial interconnection resistance between the corresponding pair of cell groups or a parallel interconnection resistance between the corresponding pair of cell groups into account.

11. The method of claim 6, wherein calculating the at least one aggregate current-voltage characteristic curve comprises calculating an aggregate current-voltage characteristic curve for applying as input to an objective function or for at least one converter that is active in accordance with the photovoltaic system configuration.

12. The method of claim 9, wherein a state equation of an Nth order thermal model further takes the selected operating point for the current time step, for a preceding time step or for a plurality of preceding time steps into account.

13. The method of claim 11, wherein calculating the at least one aggregate current-voltage characteristic curve for each converter comprises:

selecting a pair of cell groups connected to that converter in accordance with the photovoltaic system configuration;

determining whether the pair of cell groups is connected in series or in parallel to each other in accordance with the photovoltaic system configuration;

assigning a resistance to the serial or parallel connection between the pair of cell groups in accordance with the photovoltaic system configuration;

subtracting a linear current-voltage curve from either or both of the current-voltage characteristic curves selected for that pair of cell groups, wherein a voltage over current ratio of the linear current-voltage curve is determined by the assigned resistance; and combining the current-voltage characteristic curves, after the subtraction, by either adding currents as function of voltage, if the pair is connected in parallel, or adding voltages as function of current, if the pair is connected in series.

14. A non-transitory computer-readable storage medium having stored thereon instructions that, when executed by a computing device, cause the computing device to perform operations for generating or updating a database comprising a plurality of current-voltage characteristic curves, the operations comprising:

simulating, for an at least one combination of a topology of a photovoltaic cell group, at least one internal temperature for the photovoltaic cells in the photovoltaic cell group and at least one cell irradiation for the photovoltaic cells in the photovoltaic cell group, a model of the photovoltaic cell group to provide a current-voltage characteristic curve representative of the at least one combination;

clustering the current-voltage characteristic curves to identify at least one plurality of similar current-voltage characteristic curves; and generating a many-to-one mapping in the database to map query requests that correspond to each of the at least one plurality of similar current-voltage characteristic curves onto a single representative current-voltage characteristic curve for that plurality of similar current-voltage characteristic curves, each query request identifying a topology of a photovoltaic cell group, at least one internal temperature for the photovoltaic cells in the photovoltaic cell group and at least one cell irradiation for the photovoltaic cells in the photovoltaic cell group, wherein identifying the similar current-voltage characteristic curves comprises calculating a distance metric between each pair of current-voltage characteristic curves, the distance metric being a maximum difference in current or voltage, the distance metric being a difference between each area under the curve for the pair of current-voltage characteristic curves or the distance metric being based on a comparison of a predetermined quantity that is determined by a functional relationship from the voltage and current defined by the pair of current-voltage characteristic curves.

15. The non-transitory computer-readable storage medium of claim 14, wherein the clustering of the current-voltage characteristic curves further comprises identifying a plurality of current-voltage characteristic curves that are dissimilar with respect to any of the curves of the at least one plurality of similar current-voltage characteristic curves, and generating a many-to-one mapping in the database to map query requests that correspond to each of the plurality of dissimilar current-voltage characteristic curves onto one or more backup scenarios.

16. The non-transitory computer-readable storage medium of claim 14, further comprising determining a compact representation of a current-voltage characteristic curve, wherein the determining of the compact representation comprises:
  determining at least one curve segment of the current-voltage characteristic curve that is substantially linear and representing the curve segment in the compact representation by a current value and a voltage value for each of both endpoints of the curve segment; and
  adding current values and voltage values corresponding to a frequent operating point, an open circuit voltage or a short-circuit current to the compact representation.

17. The non-transitory computer-readable storage medium of claim 14, further comprising:
  generating a plurality of combinations by an exhaustive enumeration of, or sampling from, a parameter space defined by at least one internal temperature for the photovoltaic cells in the photovoltaic cell group and at least one cell irradiation for the photovoltaic cells in the photovoltaic cell group,
  selecting the at least one combination simulating from the generated plurality of combinations by eliminating improbable combinations, infeasible combinations or redundant combinations from the plurality of combinations, and, for combinations of the generated plurality of combinations that were eliminated for being improbable, providing a rough estimate of the current-voltage characteristic curve instead of simulating the current-voltage characteristic curve using the model.

18. The non-transitory computer-readable storage medium of claim 17, wherein selecting the at least one combination from the plurality of generated combinations comprises:
  eliminating combinations, from the plurality of generated combinations, wherein the current-voltage characteristic curve can be represented by a parameterized transformation of another current-voltage characteristic curve corresponding to another of the plurality generated combinations; and
  determining the current-voltage characteristic curve for the eliminated combinations by the parameterized transformation.

* * * * *